United States Patent
Pettey et al.

(10) Patent No.: US 9,823,825 B2
(45) Date of Patent: *Nov. 21, 2017

(54) MULTICHANNEL CONTROLLER

(71) Applicant: Robotzone, LLC, Winfield, KS (US)

(72) Inventors: Brian T. Pettey, Winfield, KS (US); Christopher L. Holt, Edina, MN (US)

(73) Assignee: ROBOTZONE, LLC, Winfield, KS (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/303,894

(22) Filed: Jun. 13, 2014

(65) Prior Publication Data

US 2014/0298233 A1    Oct. 2, 2014

Related U.S. Application Data

(63) Continuation of application No. 13/083,912, filed on Apr. 11, 2011, now Pat. No. 8,791,911.

(Continued)

(51) Int. Cl.
*G06F 3/0485* (2013.01)
*G06F 3/0484* (2013.01)
*G06F 3/0488* (2013.01)

(52) U.S. Cl.
CPC ........ *G06F 3/04847* (2013.01); *G06F 3/0485* (2013.01); *G06F 3/0488* (2013.01)

(58) Field of Classification Search
CPC .............................. G06F 3/04847; G06F 3/048
See application file for complete search history.

(56) References Cited

U.S. PATENT DOCUMENTS

| 405,523 A | 6/1889 | Barton |
|---|---|---|
| 1,320,234 A | 10/1919 | Johnson |

(Continued)

FOREIGN PATENT DOCUMENTS

| JP | 2004077706 A | 3/2004 |
|---|---|---|
| WO | WO 2013123547 A1 | 8/2013 |

OTHER PUBLICATIONS

Prosecution History for U.S. Appl. No. 13/083,912 including: Issue Notification dated Jul. 9, 2014, Notice of Allowance dated May 28, 2014, Amendment with RCE dated Apr. 15, 2014, Applicant Initiated Interview Summary dated Apr. 11, 2014, Advisory Action dated Apr. 2, 2014, Amendment after Final dated Mar. 27, 2014, Final Office Action dated Feb. 3, 2014, Amendment dated Nov. 18, 2013, Non-Final Office Action dated Jun. 18, 2013, Application and Drawings filed Apr. 11, 2011, 146 pages.

(Continued)

*Primary Examiner* — Jeanette J Parker
(74) *Attorney, Agent, or Firm* — Katherine M. Schulz; Kelly, Holt & Christenson, PLLC

(57) ABSTRACT

Multichannel device controllers are disclosed. In one embodiment, a multichannel device controller includes a plurality of user selectable control modes for controlling a multichannel device and a plurality of user configurable settings for adjusting parameters associated with the plurality of user selectable control modes. A touchscreen displays a user interface corresponding to a selected one of plurality of user selectable control modes and receives user input indicative of a command to send to the multichannel device. A processor generates the command to send to the multichannel device based at least in part on the user input and the plurality of user configurable settings.

18 Claims, 26 Drawing Sheets

Related U.S. Application Data

(60) Provisional application No. 61/441,113, filed on Feb. 9, 2011.

(56) References Cited

U.S. PATENT DOCUMENTS

| | | | |
|---|---|---|---|
| 1,371,622 | A | 3/1921 | Hudson |
| 2,420,425 | A | 5/1947 | Hardwick |
| D150,753 | S | 8/1948 | Carr |
| 3,145,960 | A | 8/1964 | Langdon |
| 3,953,774 | A | 4/1976 | Sato et al. |
| D243,929 | S | 4/1977 | Dimiceli et al. |
| 4,033,531 | A | 7/1977 | Levine |
| 4,044,978 | A | 8/1977 | Williams |
| 4,433,825 | A | 2/1984 | Dernedde et al. |
| D296,075 | S | 6/1988 | Jones |
| 5,024,002 | A | 6/1991 | Possati |
| 5,053,685 | A | 10/1991 | Bacchi |
| D327,518 | S | 6/1992 | Pagel |
| D342,011 | S | 12/1993 | Maguire |
| 5,526,041 | A | 6/1996 | Glatt |
| 5,528,289 | A | 6/1996 | Cortjens et al. |
| 5,557,154 | A | 9/1996 | Erhart |
| 5,806,402 | A | 9/1998 | Henry |
| 5,817,119 | A | 10/1998 | Klieman et al. |
| 6,121,966 | A | 9/2000 | Teodosio et al. |
| 6,249,091 | B1 | 6/2001 | Belliveau |
| 6,281,930 | B1 | 8/2001 | Parker |
| 6,396,961 | B1* | 5/2002 | Wixson ............... G06T 7/0018 348/E5.046 |
| 6,624,846 | B1 | 9/2003 | Lassiter |
| 6,782,308 | B2 | 8/2004 | Yamaura |
| 7,149,549 | B1 | 12/2006 | Ortiz et al. |
| 7,270,589 | B1 | 9/2007 | Brown et al. |
| 7,285,884 | B2 | 10/2007 | Pettey |
| 7,336,009 | B2 | 2/2008 | Pettey |
| D571,643 | S | 6/2008 | Newman |
| 7,501,731 | B2 | 3/2009 | Pettey |
| 7,527,439 | B1 | 5/2009 | Dumm |
| 7,559,129 | B2 | 7/2009 | Pettey |
| 7,671,497 | B2 | 3/2010 | Pettey |
| 7,750,517 | B2 | 7/2010 | Pettey |
| 7,750,944 | B2 | 7/2010 | Arbogast |
| 7,795,768 | B2 | 9/2010 | Pettey |
| 7,811,008 | B2 | 10/2010 | Dumm |
| 7,859,151 | B2 | 12/2010 | Pettey |
| 7,891,902 | B2 | 2/2011 | Pettey |
| 7,900,927 | B1 | 3/2011 | Bliehall |
| 7,934,691 | B2 | 5/2011 | Pettey |
| 8,083,420 | B2 | 12/2011 | Dumm |
| 8,200,078 | B2 | 6/2012 | Dumm |
| 8,277,349 | B2 | 10/2012 | Erhart et al. |
| 8,712,602 | B1 | 4/2014 | Oliver et al. |
| 8,791,663 | B2 | 7/2014 | Pettey |
| 8,791,911 | B2 | 7/2014 | Pettey et al. |
| 8,816,553 | B2 | 8/2014 | Pettey |
| 2001/0015918 | A1 | 8/2001 | Bhatnagar |
| 2002/0063799 | A1 | 5/2002 | Ortiz et al. |
| 2003/0093430 | A1* | 5/2003 | Mottur ............... H04N 5/23203 |
| 2003/0174242 | A1 | 9/2003 | Carmi et al. |
| 2004/0032495 | A1 | 2/2004 | Ortiz |
| 2004/0184798 | A1 | 9/2004 | Dumm |
| 2005/0110634 | A1 | 5/2005 | Salcedo et al. |
| 2006/0003865 | A1 | 1/2006 | Pettey |
| 2006/0082662 | A1 | 4/2006 | Isaacson |
| 2006/0114322 | A1* | 6/2006 | Romanowich ........ G06T 7/004 348/143 |
| 2006/0250357 | A1* | 11/2006 | Safai ................... G06F 3/038 345/157 |
| 2006/0256188 | A1* | 11/2006 | Mock ............... H04L 29/06027 348/14.09 |
| 2006/0269264 | A1 | 11/2006 | Stafford et al. |
| 2006/0288375 | A1 | 12/2006 | Ortiz |
| 2007/0219666 | A1 | 9/2007 | Filippov et al. |
| 2008/0018737 | A1* | 1/2008 | Suzuki ............... G06F 17/3079 348/143 |
| 2008/0084481 | A1* | 4/2008 | Lindsay ............ H04N 5/23203 348/211.7 |
| 2008/0088089 | A1 | 4/2008 | Bliehall et al. |
| 2008/0149072 | A1 | 6/2008 | Rottenwohrer et al. |
| 2009/0009605 | A1 | 1/2009 | Ortiz |
| 2009/0073388 | A1 | 3/2009 | Dumm |
| 2009/0128631 | A1 | 5/2009 | Ortiz |
| 2009/0141130 | A1 | 6/2009 | Ortiz |
| 2009/0179129 | A1 | 7/2009 | Pettey |
| 2009/0247045 | A1 | 10/2009 | Pettey |
| 2009/0310957 | A1 | 12/2009 | Matsushima et al. |
| 2009/0322866 | A1 | 12/2009 | Stotz et al. |
| 2010/0045666 | A1 | 2/2010 | Kornmann et al. |
| 2010/0110192 | A1 | 5/2010 | Johnston et al. |
| 2010/0141767 | A1 | 6/2010 | Mohanty et al. |
| 2010/0328467 | A1 | 12/2010 | Yoshizumi |
| 2010/0328524 | A1 | 12/2010 | Yoshizumi |
| 2011/0025861 | A1 | 2/2011 | Dumm |
| 2011/0045445 | A1 | 2/2011 | Spychalski |
| 2011/0050926 | A1 | 3/2011 | Asano |
| 2011/0085042 | A1 | 4/2011 | Lee et al. |
| 2011/0089639 | A1 | 4/2011 | Bellamy et al. |
| 2011/0115344 | A1 | 5/2011 | Pettey |
| 2011/0205380 | A1 | 8/2011 | Shirakawa |
| 2011/0248448 | A1 | 10/2011 | Hodge |
| 2011/0267462 | A1 | 11/2011 | Cheng et al. |
| 2011/0285636 | A1* | 11/2011 | Howard ............. G06F 3/04815 345/173 |
| 2012/0139468 | A1 | 6/2012 | Pettey |
| 2012/0192078 | A1* | 7/2012 | Bai ................... G06F 3/04886 715/740 |
| 2012/0200510 | A1 | 8/2012 | Pettey et al. |
| 2012/0208150 | A1 | 8/2012 | Spychaiski |
| 2012/0313557 | A1 | 12/2012 | Pettey et al. |
| 2013/0193645 | A1 | 8/2013 | Kazakov et al. |
| 2013/0341869 | A1 | 12/2013 | Lenoff |
| 2014/0298233 | A1 | 10/2014 | Pettey et al. |
| 2014/0356817 | A1 | 12/2014 | Brooks et al. |
| 2016/0018198 | A1 | 1/2016 | Pettey et al. |

OTHER PUBLICATIONS

Prosecution History for U.S. Appl. No. 13/221,477 including: Amendment dated Sep. 14, 2015, Non-Final Office Action dated Jul. 10, 2015, Amendment with RCE dated Aug. 7, 2014, Final Office Action dated Jun. 12, 2014, Amendment dated Jan. 10, 2014, Non-Final Office Action dated Aug. 14, 2013 and Application and Drawings filed Aug. 30, 2011, 138 pages.

Printed from http://seattlerobotics.org/encoder/200010/servohac. htm, published Sep. 19, 2000, printed Oct. 20, 2015, 9 pages.

Issue Notification for U.S. Appl. No. 13/655,883 dated Jul. 9, 2014, 1 page.

Prosecution History for U.S. Appl. No. 13/593,724 including: Issue Notification dated Aug. 6, 2014 and Notice of Allowance dated Jun. 25, 2014, 10 pages.

Prosecution History for U.S. Appl. No. 13/616,316 including: Amendment dated Oct. 8, 2015, Non-Final Office Action dated Aug. 6, 2015, Response to Notice of Non-Compliant Amendment dated Jul. 6, 2015, Notice of Non-Compliant Amendment dated Jul. 2, 2015, Response to Restriction Requirement dated Jun. 23, 2015, Requirement for Restriction/Election dated Apr. 27, 2015, 40 pages.

"Photo Higher Design History" received from a Third Party during licensing negotiations in Oct. 2012, 4 pages.

"KAPER: Digital Photography E-Resources", What's New, Reverse chronology of additions or changes to KAPER, http://www.kaper. us/NewKAP_R.html, printed Nov. 20, 2012, 14 pages.

"RunRyder: Helicopters", Aerial Photography and Video: My Rig—cam mount, http://rc.runryder.com/helicopter/t47322p1/, printed Nov. 26, 2012, 7 pages.

"KAPER: Digital Photography E-Resources", Basics/Camera Cradle/360 Servo Conversions Method 2—Geared External Pot, http://www.kaper.us/basics/BAS-360_2_R.html, printed Nov. 20, 2012, 2 pages.

(56) References Cited

OTHER PUBLICATIONS

"RunRyder: Helicopters", Aerial Photography and Video: My First Camera Mount, http://rc.runryder.com/helicopter/t55545p1/, printed Nov. 20, 2012, 1 page.
"RunRyder: Helicopters", Aerial Photography and Video: Front mount side frame contest, http://rc.runryder.com/helicopter/t144518p1/, printed Nov. 26, 2012, 6 pages.
"RunRyder: Helicopters", Aerial Photography and Video: My current camera mount, http://rc.runryder.com/helicopter/t135298p1/, printed Nov. 26, 2012, 5 pages.
"RunRyder: Helicopters", Aerial Photography and Video: My new camera mount development, http://rc.runryder.com/helicopter/t137031p1/, printed Nov. 26, 2012, 7 pages.
"RunRyder: Helicopters", Aerial Photography and Video: Injection moulded Camera Mount, http://rc.runryder.com/helicopter/t178271p1/, printed Nov. 20, 2012, 4 pages.
Prosecution History for U.S. Appl. No. 13/655,883, filed Oct. 19, 2012, including Application Filed Oct. 19, 2012, Non-Final Office Action dated Apr. 3, 2014, Response filed Apr. 21, 2014, and Notice of Allowance dated May 28, 2014, 42 pages.
Prosecution History of U.S. Appl. No. 13/593,724, filed Aug. 24, 2012, including Application Filed Aug. 24, 2012, Non-Final Office Action dated May 23, 2014, and Response filed Jun. 10, 2014, 56 pages.
Prosecution History for U.S. Appl. No. 13/616,316, filed Sep. 14, 2012, including Application Filed Sep. 14, 2012, 18 pages.
Prosecution History for U.S. Appl. No. 14/332,857 including: Amendment dated Dec. 21, 2015, Non-Final Office Action dated Nov. 16, 2015, Preliminary Amendment dated Aug. 21, 2014 and Application and Drawings filed Jul. 16, 2014, 77 pages.
Jeremy Cook, Servo City and off-the-shelf Servo Brackets, Sep. 14, 2011, JCoPro.net, 2 pages.
Final Office Action for U.S. Appl. No. 13/221,477 dated Dec. 30, 2015, 18 pages.
Prosecution History for U.S. Appl. No. 13/616,316 including: Amendment with RCE dated Jan. 25, 2016, Final Office Action dated Oct. 26, 2015, 19 pages.
Prosecution History for U.S. Appl. No. 14/332,857 including: Amendment with RCE dated May 11, 2016, Final Office Action dated Apr. 15, 2016. 27 pages.
Prosecution History for U.S. Appl. No. 13/221,477 including: Applicant Response dated Feb. 22, 2015, Notice of Allowance dated Apr. 13, 2016. 14 pages.
Prosecution History for U.S. Appl. No. 14/322,857 including: Notice of Allowance dated Apr. 10, 2017, Amendment with RCE dated Feb. 7, 2017, Non-Final Office action dated Jul. 5, 2016, Amendment dated Aug. 23, 2016, Final Office Action dated Dec. 1, 2016, 64 pages.
Issue Notification for U.S. Appl. No. 13/221,477 dated Jun. 22, 2016, 1 page.

* cited by examiner

MULTICHANNEL CONTROLLER

REFERENCE TO RELATED CASE

The present application is based on and claims the benefit of U.S. patent application Ser. No. 13/083,912, filed Apr. 11, 2011, which is based on and claims the benefit of U.S. provisional patent application Ser. No. 61/441,113, filed Feb. 9, 2011, the content of which is hereby incorporated by reference in its entirety.

BACKGROUND

Multichannel controllers are commonly used to control a wide variety of systems. For example, a multichannel controller can be used to control a pan and tilt camera system. In such a case, one channel of the multichannel controller may be used to control pan motion of the pan and tilt camera system, and another channel of the multichannel controller may be used to control tilt motion of the pan and tilt camera system. One method of providing multichannel control has included using controllers with physical joysticks. Positioning of the physical joysticks causes signals to be sent to the system being controlled.

SUMMARY

An aspect of the disclosure relates to multichannel device controller. In one embodiment, a multichannel device controller includes a plurality of user selectable control modes for controlling a multichannel device and a plurality of user configurable settings for adjusting parameters associated with the plurality of user selectable control modes. A touchscreen displays a user interface corresponding to a selected one of plurality of user selectable control modes and receives user input indicative of a command to send to the multichannel device. A processor generates the command to send to the multichannel device based at least in part on the user input and the plurality of user configurable settings.

These and various other features and advantages that characterize the claimed embodiments will become apparent upon reading the following detailed description and upon reviewing the associated drawings.

BRIEF DESCRIPTION OF THE DRAWINGS

FIG. 13-1 is a sensitivity selector user interface of a multichannel controller.

FIG. 13-2 is a custom sensitivity user interface of a multichannel controller.

FIGS. 17-1, 17-2, 17-3, and 17-4 are user interfaces of a multichannel controller associated with managing user profiles.

FIGS. 18-1, 18-2, 18-3, and 18-4 are user interfaces of a multichannel controller associated with managing predefined motions.

DETAILED DESCRIPTION

Embodiments of the present disclosure include multichannel controllers. In certain embodiments, multichannel controllers are used to control motion of pan and tilt camera systems. Embodiments are not however limited to any particular setting. Those skilled in the art will appreciate that although some embodiments are described in the context of pan and tilt camera systems, that embodiments are not limited to pan and tilt systems and can be used in other settings. Additionally, the present disclosure presents several examples of user interfaces that can be used to implement multichannel controllers. Those skilled in the art will appreciate that embodiments are not limited to the specific user interfaces shown in the figures and may include any one or more combination of features shown in the example interfaces.

Embodiments of multichannel controllers are implemented using any suitable computing device. In one configuration, a controller is implemented using a smart phone such as an Android based phone or an iPhone. Alternatively, a controller can be implemented using a specially chosen device.

In one embodiment, a multichannel controller sends signals to pan and tilt motors to control pan and tilt motions of a camera. In one configuration, each motor is capable of receiving a signal that indicates a direction of rotation (e.g. clockwise or counterclockwise) and a speed of rotation (e.g. 0-100% of the maximum rotational speed of the motor).

Figure 1:
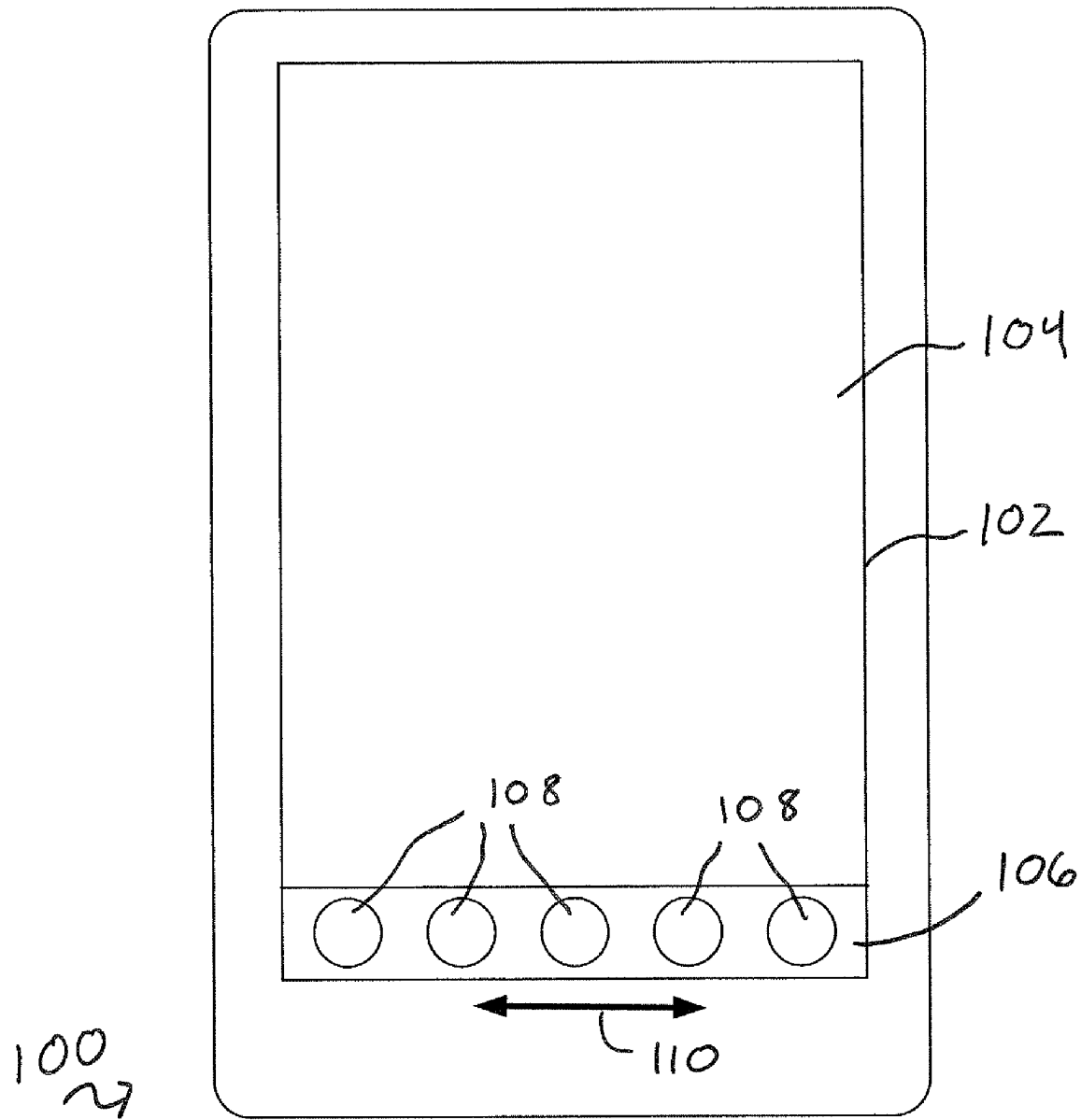
FIG. 1 is a multichannel controller implemented using a handheld device.

FIG. 1 shows a handheld device 100 that is used to implement a multichannel controller. Handheld device 100 includes a touchscreen 102 that displays user interfaces of the controller. Each of the user interfaces includes a main portion 104 and an icons portion 106 (e.g. a scrollable icons taskbar). Icons portion 106 includes icons 108 that are used to configure various control modes and settings of a multichannel device. As will be described in greater detail below, the application may include more icons 108 than can be shown in icons portion 106. In such a case, a user can scroll the icons to the left or right to view additional icons. For instance, in the example shown in FIG. 1, only five icons 108 are shown in icons portion 106. A user can view icons to the left of the five icons 108 by touching any part of icons portion 106 and moving it to the right. Similarly, a user can view icons to the right of the five icons 108 by touching any part of icons portion 106 and moving it to the left. The left and right motion capability of icons portion 106 is represented by arrow 110.

Figure 2:
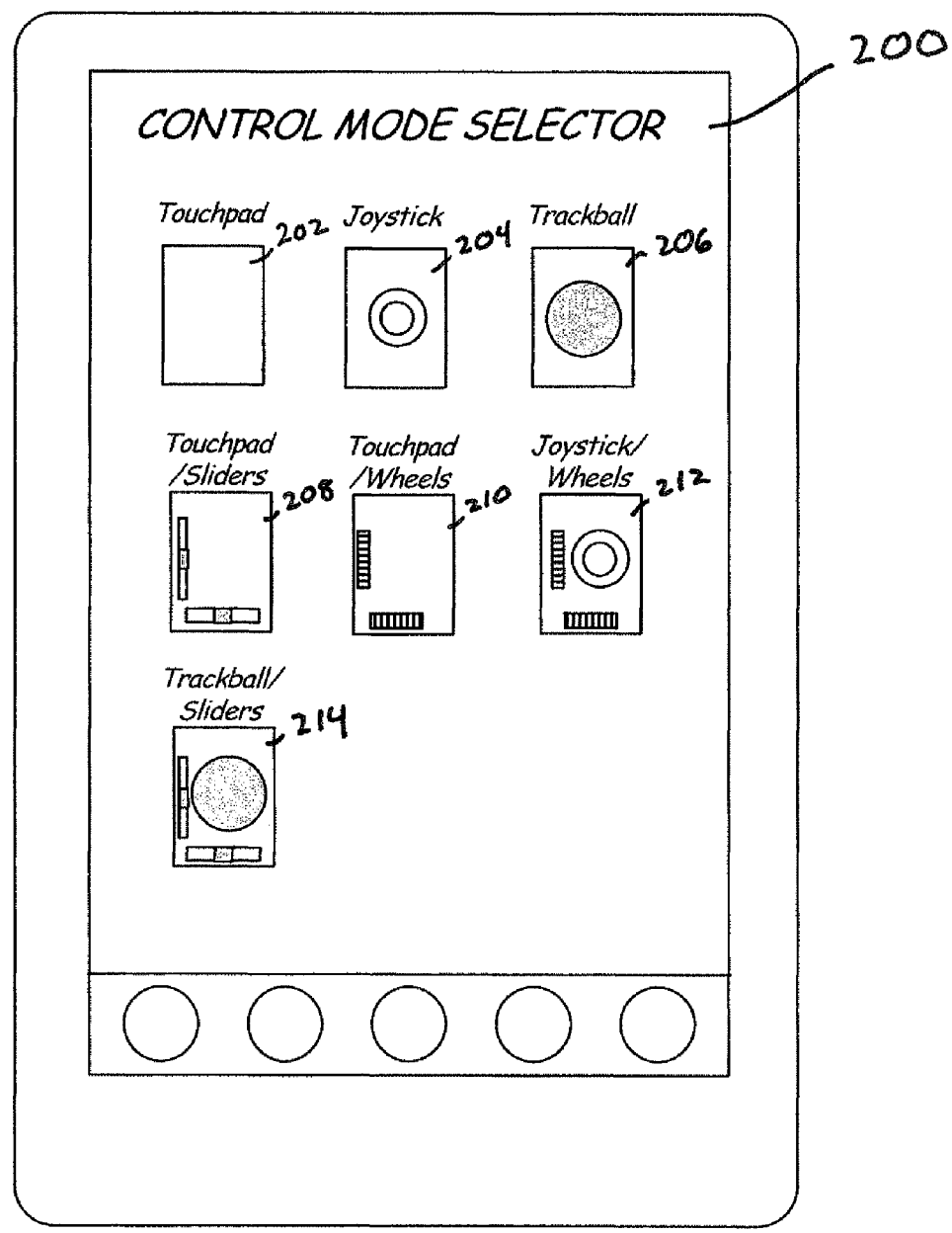
FIG. 2 is a control mode selector user interface of a multichannel controller.

One of the icons 108 is a Control Mode Selector icon. Upon the Control Mode Selector icon being selected (e.g. by being touched), a Control Mode Selector interface is displayed in the main portion 104 of the user interface. FIG. 2 shows one example of a Control Mode Selector interface 200. Interface 200 includes a touchpad icon 202, a joystick icon 204, a trackball icon 206, a touchpad/slider icon 208, a touchpad/wheels icon 210, a joystick/wheels icon 212, and a trackball/sliders icon 214. Selection of one of icons 202, 204, 206, 208, 210, 212, or 214 puts the controller into the corresponding control mode. An optional confirmation step may be implemented after selection of one the icons. For instance, upon joystick icon 204 being selected, a window may be displayed that states "Do you want to enter into the Joystick Control Mode? Yes/No." The user can select "Yes" to enter the joystick control mode, or select "No" to return to the Control Mode Selector interface 200.

Figure 3:
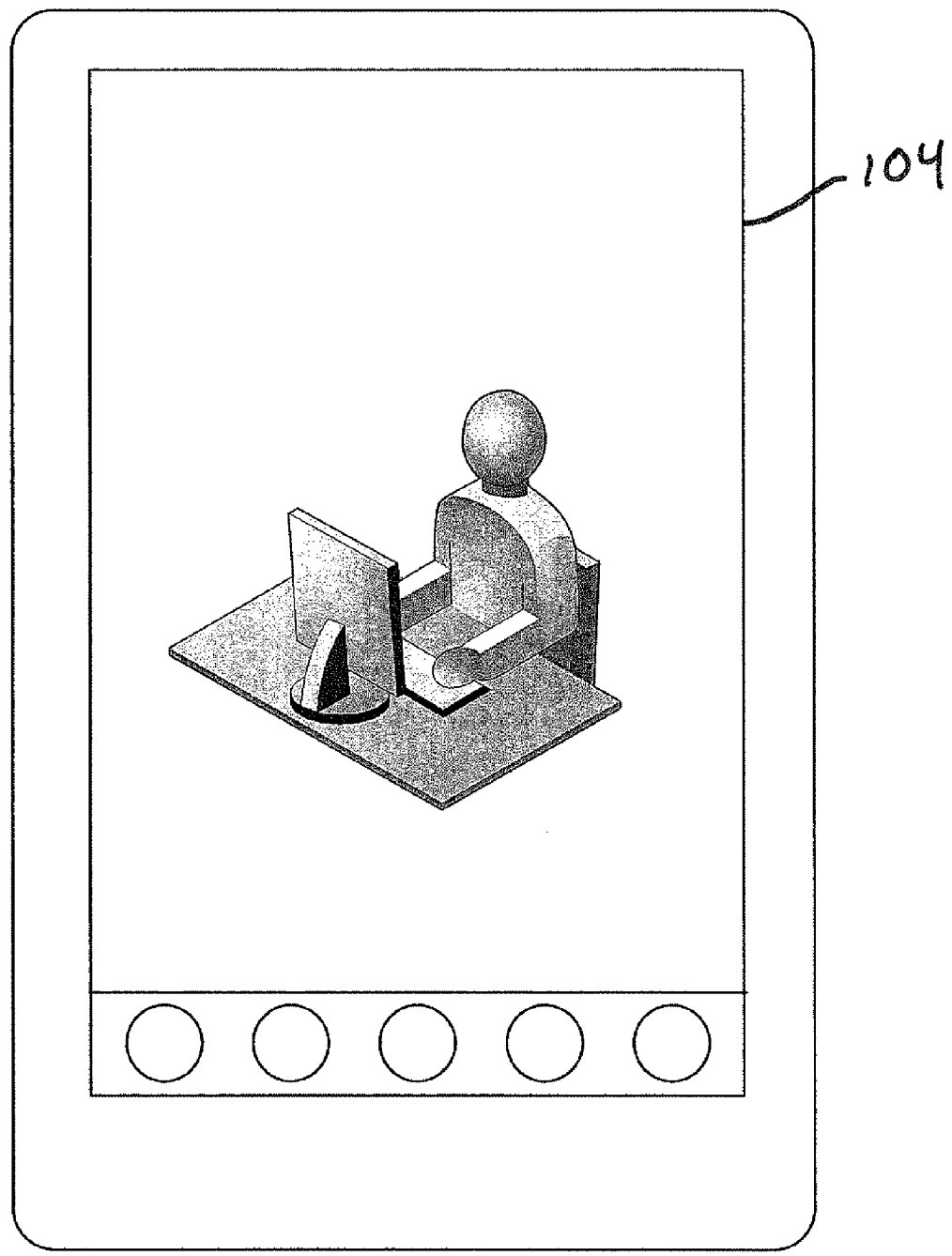
FIG. 3 is a touchpad control mode user interface of a multichannel controller.

FIG. 3 shows an example of a controller in a touchpad control mode (e.g. after selecting touchpad icon 202 in FIG. 2). In the touchpad control mode, main portion 104 of the user interface is one solid color (e.g. white). Alternatively, main portion 104 may receive and display video from the camera in the pan and tilt system. A user is able to control the motors of the pan and tilt system by making touch gestures in the main portion 104. Left-to-right and right-to-left touch gestures send signals to the pan motor to rotate, and up-to-down and down-to-up touch gestures send signals to the tilt motor to rotate. The rotational speed of the motors is dependent upon the speed of the touch gesture. For instance, a quick touch gesture sends a signal to the motor to rotate quickly, and a slow touch gesture sends a signal to the motor to rotate slowly. If a touch gesture includes a combination of up/down and left/right motions (e.g. a diagonal touch gesture), signals are sent to both the pan and tilt motors. In an embodiment, the controller is also able to control a zoom (e.g. optical or digital magnification of the camera). For instance, a user can make touch gestures associated with making an object larger to zoom in on an object, and can make touch gestures associated with making an object smaller to zoom out on an object. Additionally, a user can set the control mode of the controller to moving object track control mode. For instance, a user can select a moving object being displayed in main portion 104, and the controller controls the camera to keep the moving object within the camera's field of view.

Figure 4:
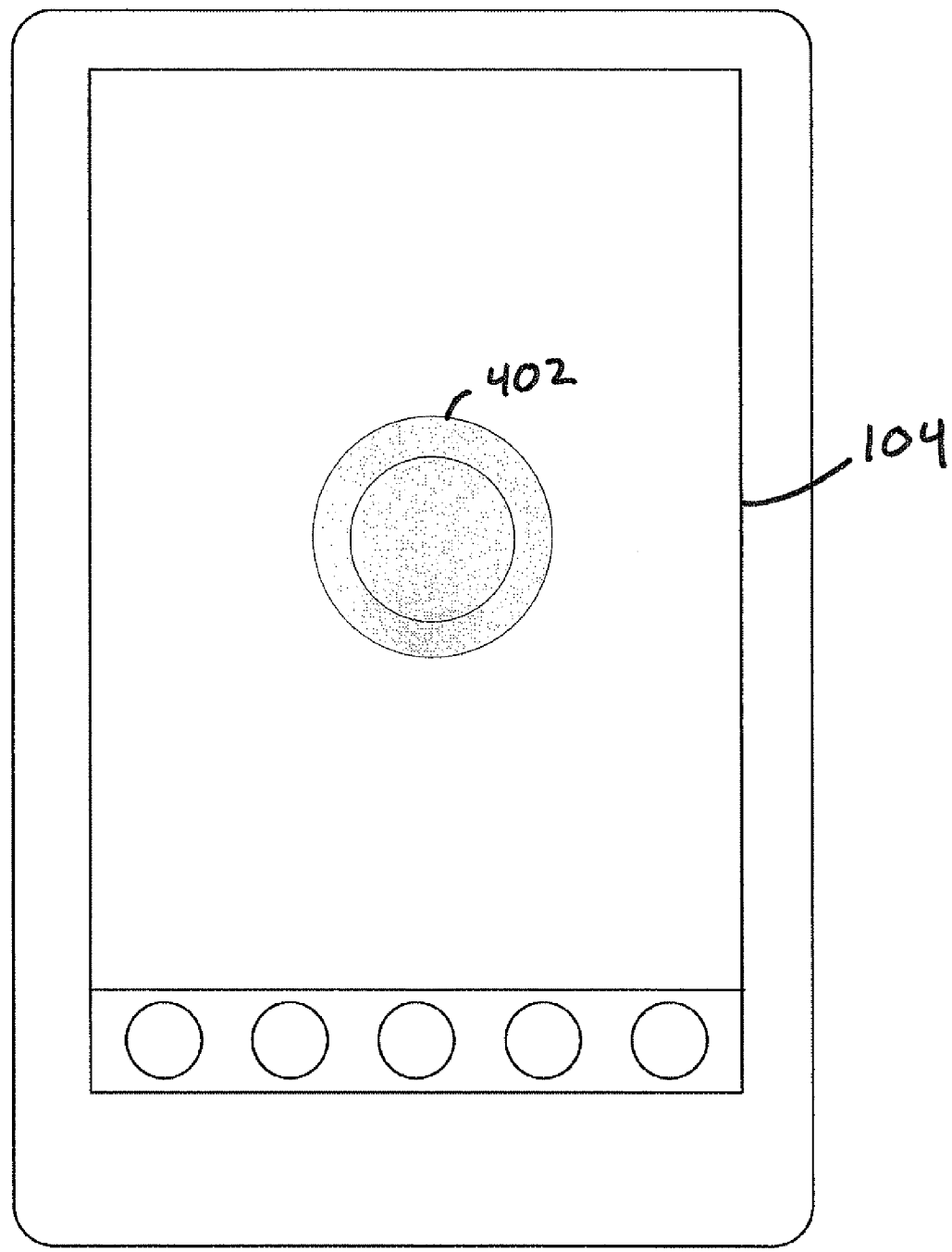
FIG. 4 is a joystick control mode user interface of a multichannel controller.

FIG. 4 shows an example of a controller in a joystick control mode (e.g. after selecting joystick icon 204 in FIG. 2). In the joystick control mode, main portion 104 of the user interface includes a joystick icon 402. A user is able to move the position of the joystick icon 402 by touching the icon and moving it in any direction (e.g. up, down, left, right, diagonally). The joystick icon 402 returns to its original position in the middle of main portion 104 when the user releases touch of the icon. In the joystick control mode, any left or right movement of the joystick icon sends a signal to rotate the pan motor, and any up or down movement of the joystick sends a signal to rotate the tilt motor. A combination of left/right and up/down movements (e.g. moving the joystick icon diagonally) sends signals to both the pan and tilt motors. The rotational speed of the motors is dependent upon the distance the joystick icon 402 is moved from its center/home position. For instance, moving the joystick icon 402 a small distance from its home position causes slow rotation, while moving the joystick icon 402 a greater distance from its home position causes faster rotation. In the joystick control mode, main portion 104 of the user interface is one solid color (e.g. white). Alternatively, main portion 104 may receive and display video from the camera in the pan and tilt system. In such a case, joystick icon 204 may be presented in transparent or translucent graphics such that a user can see video from the camera behind the joystick icon.

Figure 5:
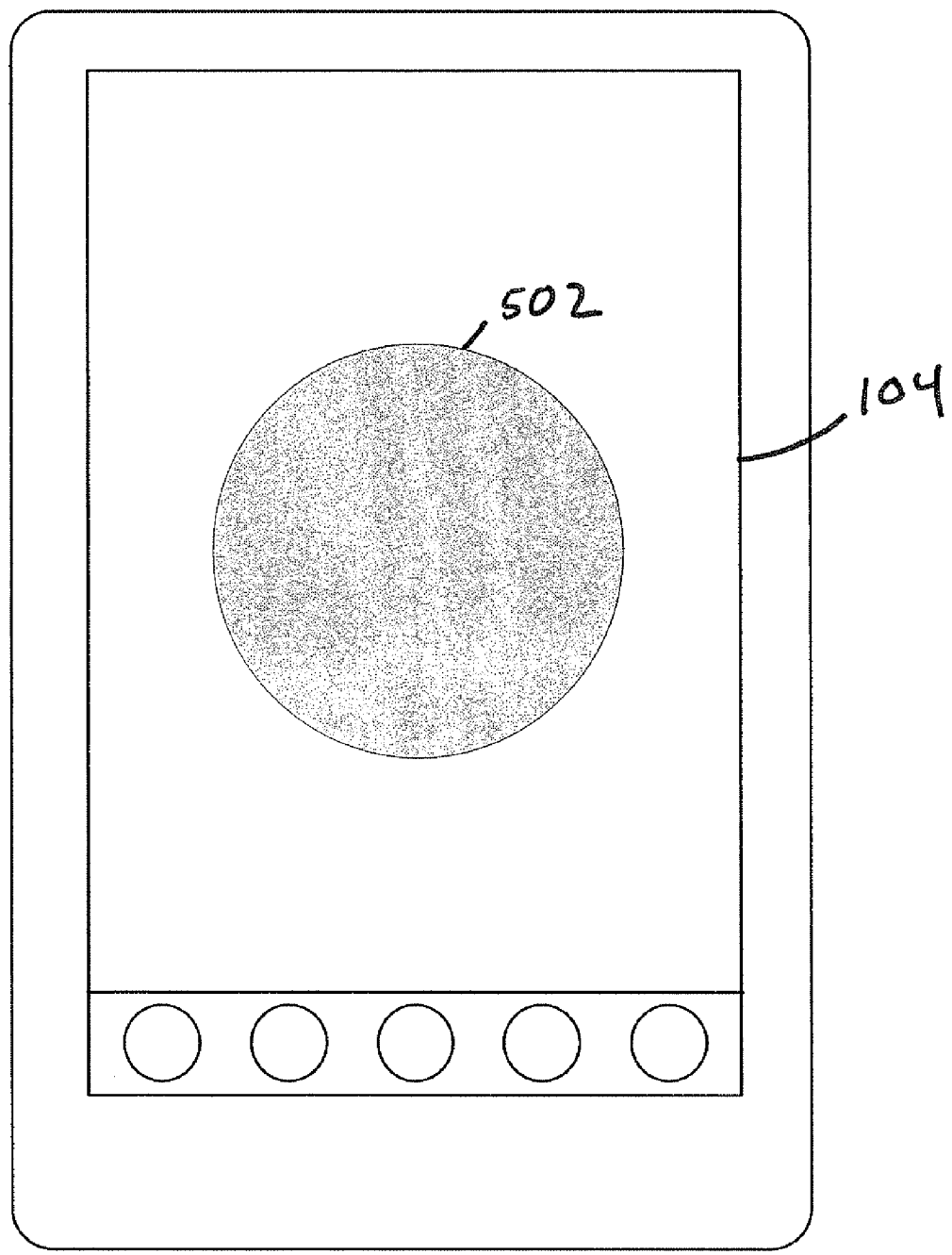
FIG. 5 is a trackball control mode user interface of a multichannel controller.

FIG. 5 shows an example of a controller in a trackball control mode (e.g. after selecting trackball icon 206 in FIG. 2). In the trackball control mode, main portion 104 of the user interface include a trackball icon 502. A user is able to simulate rotating trackball icon 502 by touching the icon and moving it in any direction (e.g. up, down, left, right, diagonally). The trackball icon 502 has simulated momentum. For instance, the trackball icon 502 will continue "rotating" for a brief period of time after the user has released touch of the icon 502. In the trackball control mode, any left or right rotation of the trackball icon sends a signal to rotate the pan motor, and any up or down rotation of the trackball sends a signal to rotate the tilt motor. A combination of up/down and left/right rotations (e.g. rotating the trackball diagonally) sends signals to both the pan and tilt motors. The rotational speed of the motors is dependent upon the rotational speed of the trackball. Fast rotation of the trackball icon 502 sends signals to the motors to rotate quickly, and slow rotation of the trackball icon 502 sends signals to the motors to rotate slowly. In the trackball control mode, main portion 104 of the user interface is one solid color (e.g. white). Alternatively, main portion 104 may receive and display video from the camera in the pan and tilt system. In such a case, trackball icon 502 may be presented in transparent or translucent graphics such that a user can see video from the camera behind the trackball icon.

Figure 6:
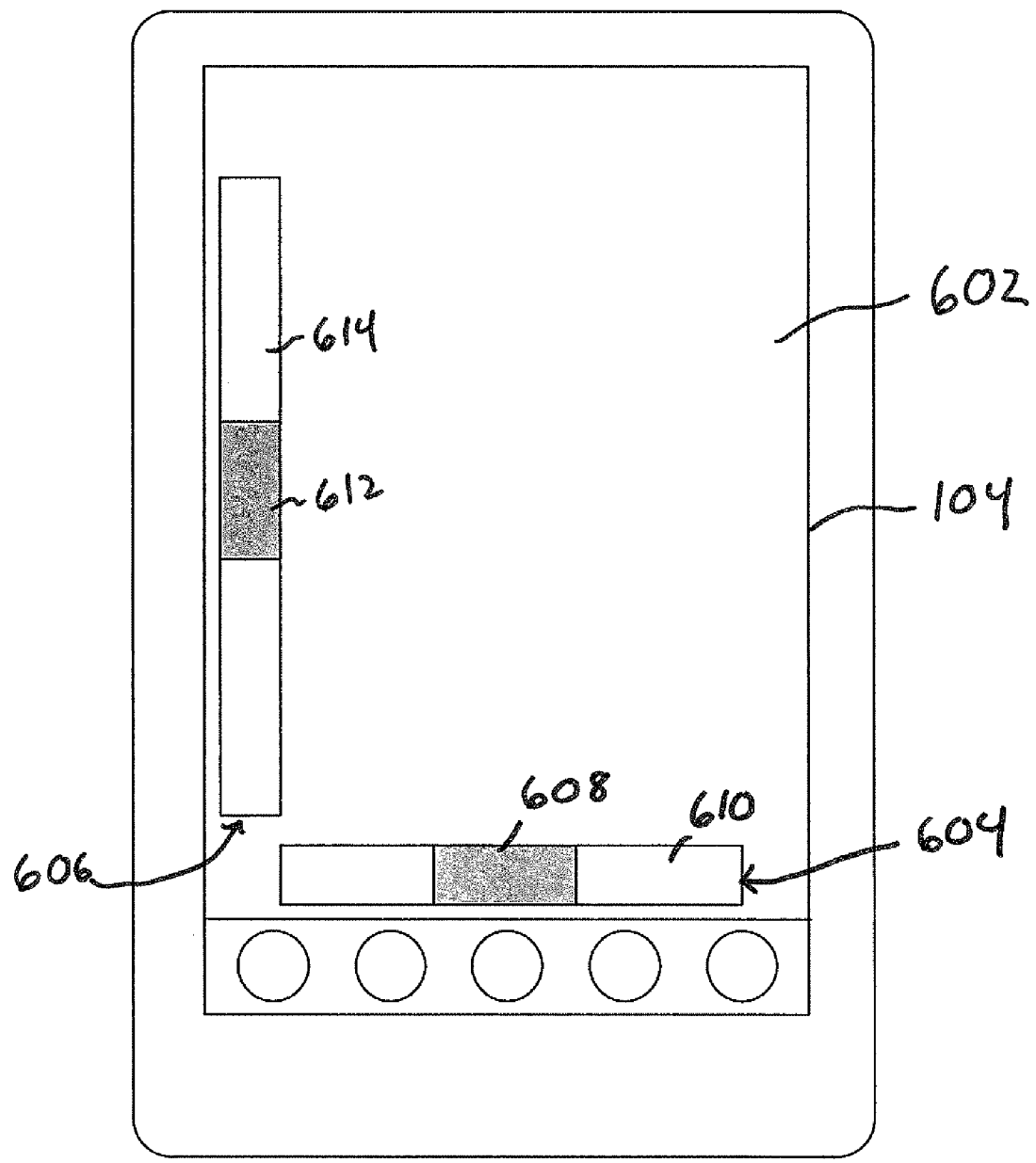
FIG. 6 is a touchpad/sliders combination control mode user interface of a multichannel controller.

FIG. 6 shows an example of a controller in a touchpad/sliders combination control mode (e.g. after selecting touchpad/sliders icon 208 in FIG. 2). In the touchpad/sliders combination control mode, main portion 104 of the user interface includes a touchpad section 602, a pan slider section 604, and a tilt slider section 606. Touchpad section 602 functions in the same manner as the touchpad mode shown in FIG. 3. For instance, touchpad section 602 either shows a solid color or shows video from the pan and tilt system camera. A user can send signals to rotate the pan and tilt motors by making touch gestures in the touchpad section 602.

Pan slider section 604 includes a moveable slider icon 608 that is able to be moved left and right within slider slot 610. Tilt slider section 606 includes a moveable slider icon 612 that is able to be moved up and down within slider slot 614. Movement of the pan slider icon 608 sends signals to the pan motor, and movement of the tilt slider icon 612 sends signals to the tilt motor. The rotational speed of the motors is dependent on how far the slider icons are moved from their center/home positions. Moving a slider icon further away from its center/home position causes faster rotation than a smaller move away from the center/home position. Additionally, similar to the joystick icon in the joystick mode, slider icons 608 and 612 move back to their center/home positions when touch is released.

Figure 7:
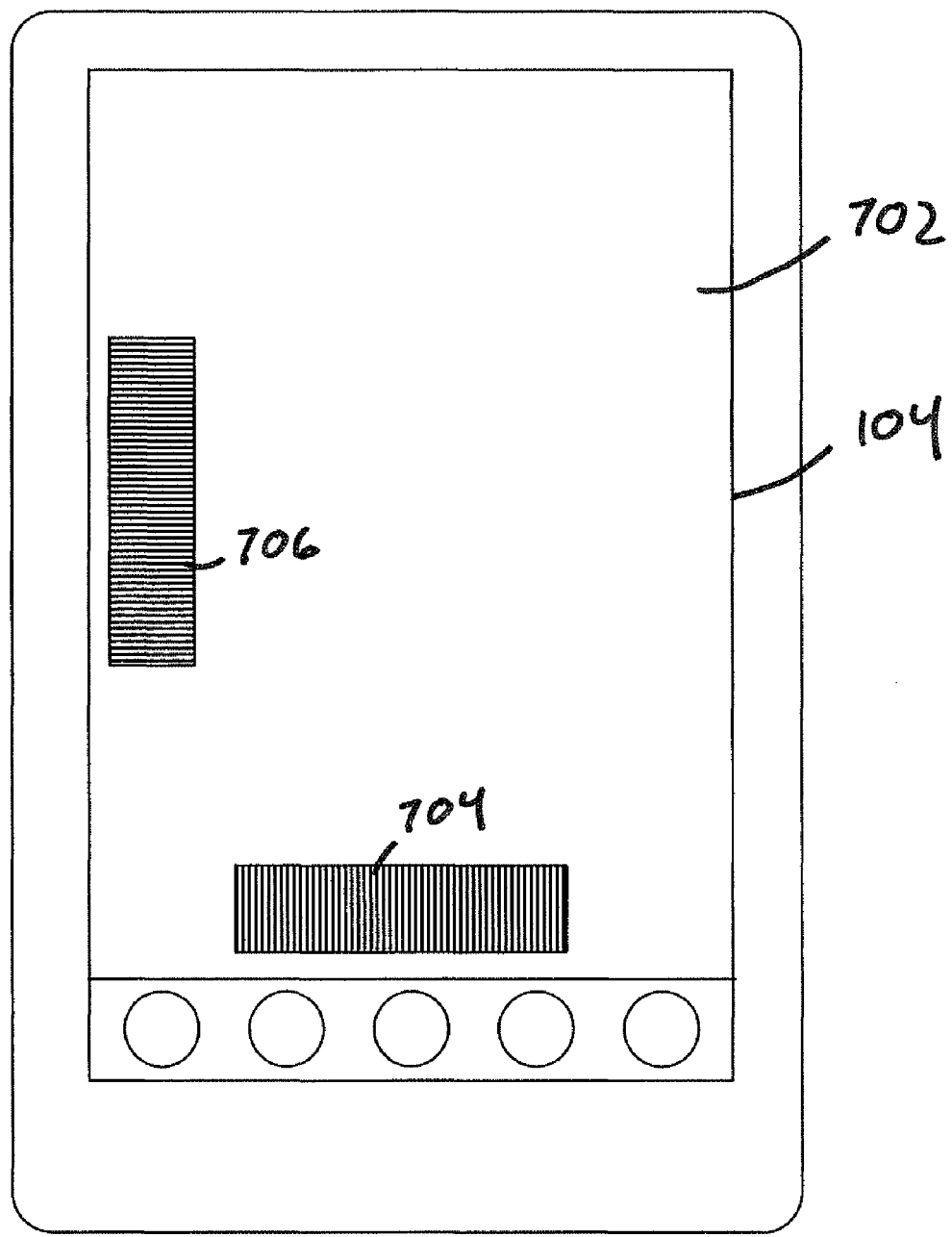
FIG. 7 is a touchpad/wheels combination control mode user interface of a multichannel controller.

FIG. 7 shows an example of a controller in a touchpad/wheels combination control mode (e.g. after selecting touchpad/wheels icon 210 in FIG. 2). In the touchpad/wheels combination control mode, main portion 104 of the user interface includes a touchpad section 702, a pan wheel icon 704, and a tilt wheel icon 706. Touchpad section 702 functions similarly to the touchpad modes shown in FIGS.

3 and 6. For instance, touchpad section 702 either shows a solid color or shows video from the pan and tilt system camera. A user can send signals to rotate the pan and tilt motors by making touch gestures in touchpad section 702.

Pan wheel icon 704 and tilt wheel icon 706 are able to be rotated in either direction. Rotation of pan wheel icon 704 sends signals to the pan motor to rotate, and rotation of tilt wheel icon 706 sends signals to the tilt motor to rotate. The speed and direction of rotation of the wheel icons determine the speed and direction of rotation of the pan and tilt motors. Fast rotation of the wheel icons sends signals to the motors to rotate quickly, and slower rotation of the wheel icons sends signals to the motors to rotate slower. The wheel icons have momentum such that the wheel icons will continue to rotate after a user has released touch of the icons.

Figure 8:
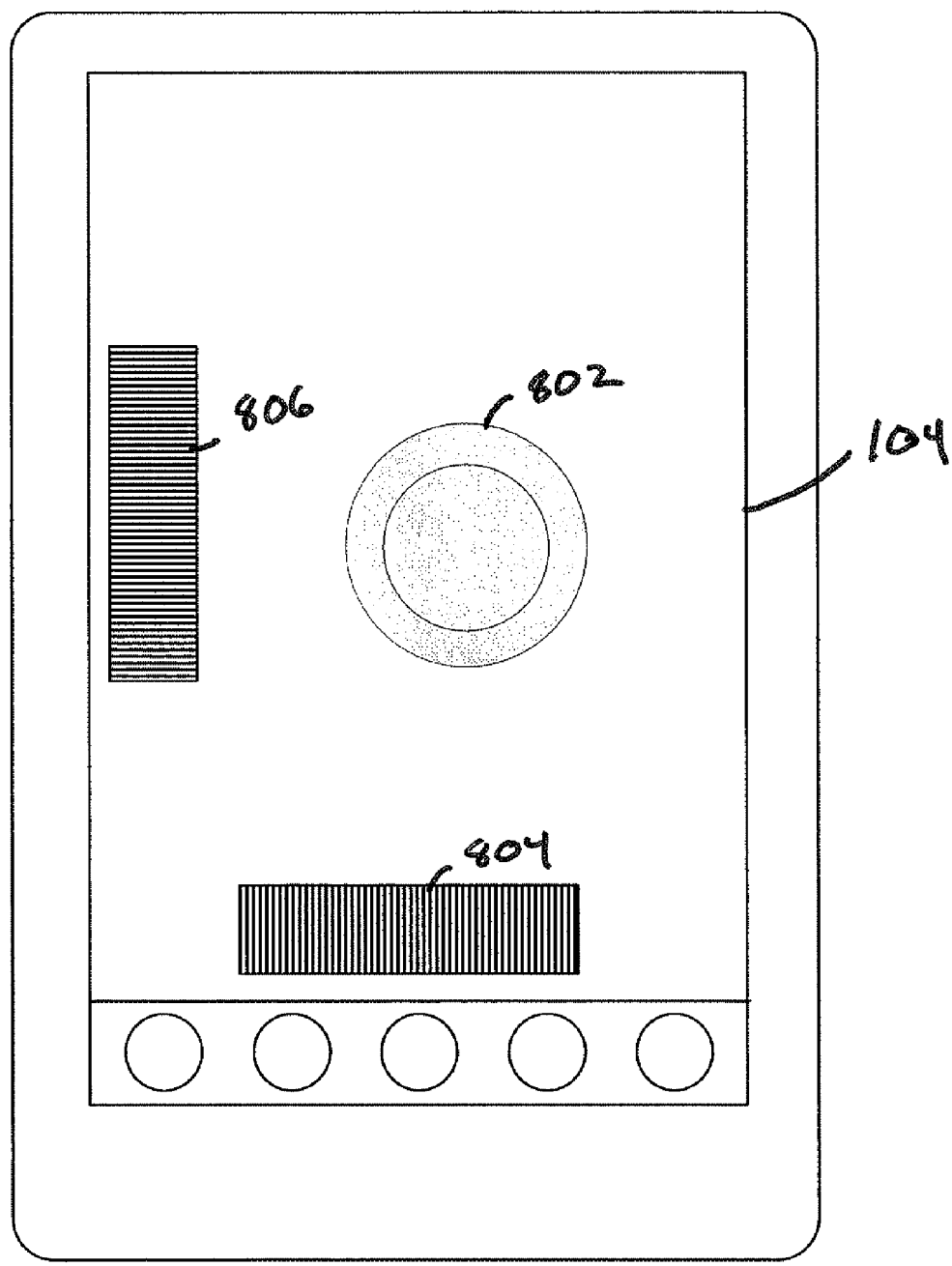
FIG. 8 is a joystick/wheels combination control mode user interface of a multichannel controller.

FIG. 8 shows an example of a controller in a joystick/wheels combination control mode (e.g. after selecting joystick/wheels icon 212 in FIG. 2). In the joystick/wheels combination control mode, main portion 104 of the user interface includes a joystick icon 802, a pan wheel icon 804, and a tilt wheel icon 806. Joystick icon 802 functions the same as joystick icon 402 in FIG. 4. Pan and tilt wheel icons 804 and 806 function the same as pan and tilt wheel icons 704 and 706 in FIG. 7. Similar to each of the other control mode user interfaces, in the joystick/wheels combination control mode, main portion 104 of the user interface is in one embodiment one solid color (e.g. white). Alternatively, main portion 104 may receive and display video from the camera in the pan and tilt system. In such a case, icons 802, 804, and 806 may be presented in transparent or translucent graphics such that a user can see video from the camera behind the icons.

Figure 9:
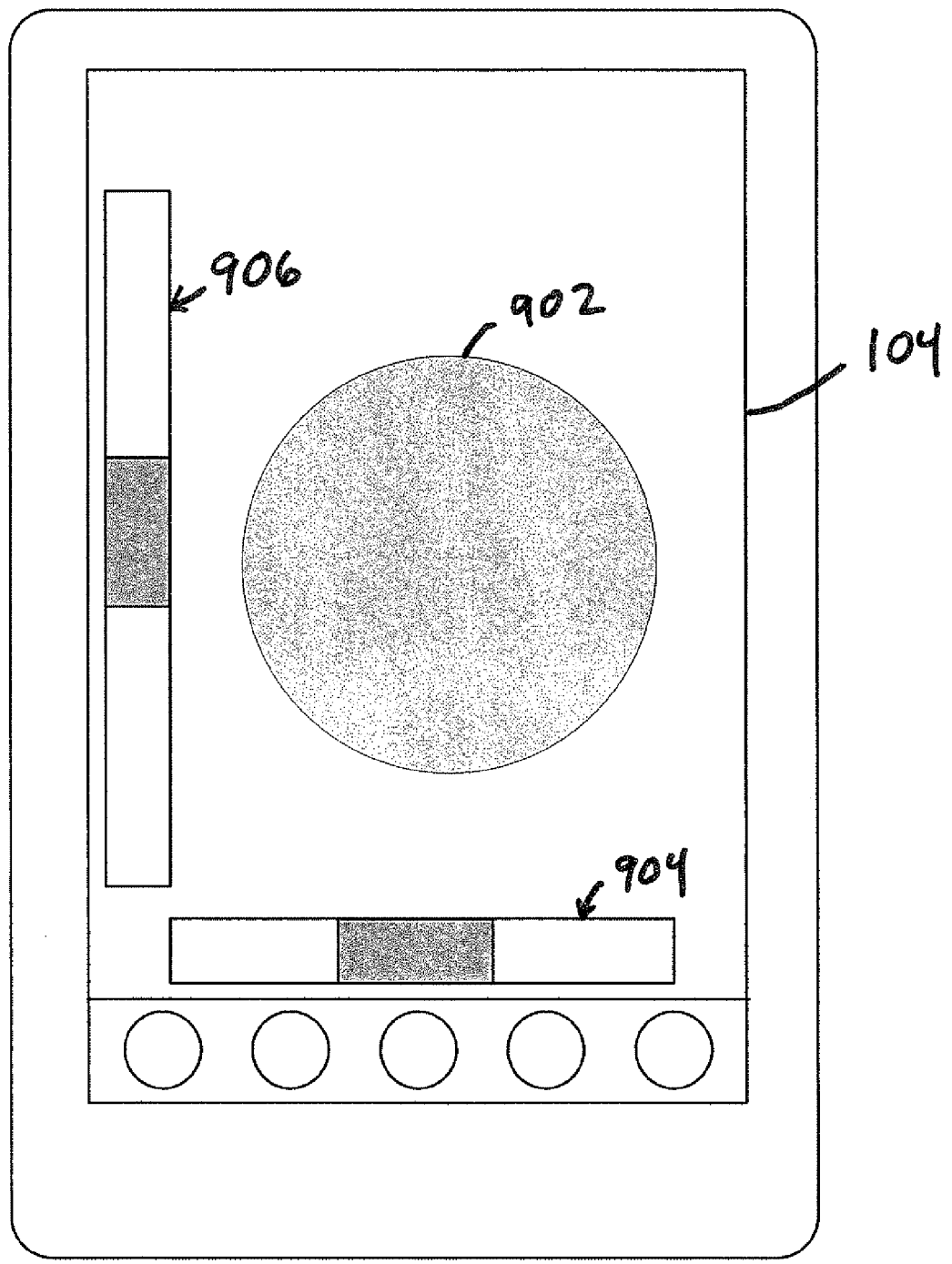
FIG. 9 is a trackball/sliders combination control mode user interface of a multichannel controller.

FIG. 9 shows an example of a controller in a trackball/sliders combination control mode (e.g. after selecting trackball/sliders icon 214 in FIG. 2). In the trackball/sliders combination control mode, main portion 104 of the user interface includes a trackball icon 902, a pan slider icon 904, and a tilt slider icon 906. Trackball icon 902 functions the same as trackball icon 502 in FIG. 5. Pan and tilt slider icons 904 and 906 function the same as pan and tilt slider icons 604 and 606 in FIG. 6. Again, the background of the user interface may be one solid color or may display video from the camera. In such a case, icons 902, 904, and 906 may be presented in transparent or translucent graphics such that a user can see camera video behind the icons.

Figure 10:
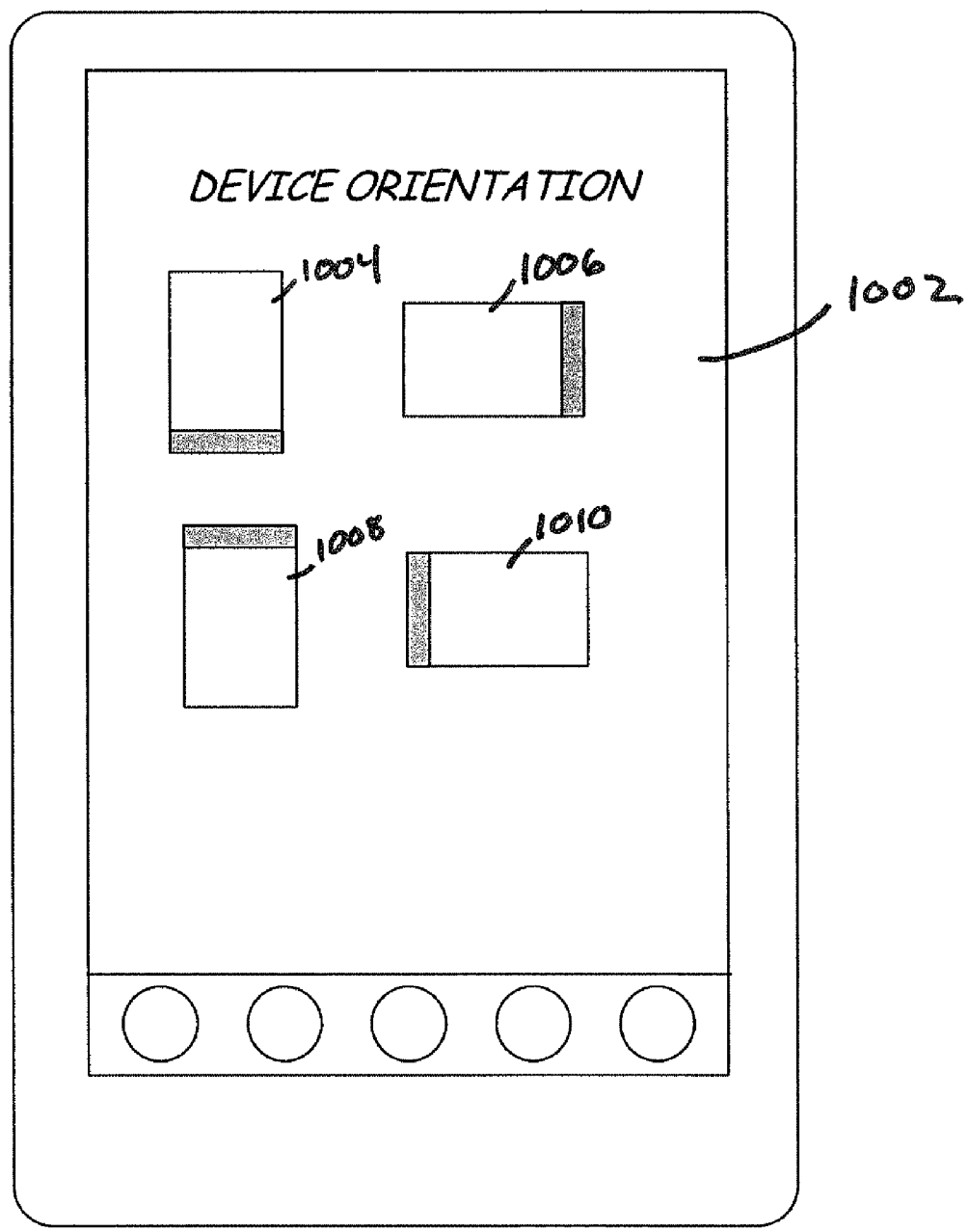
FIG. 10 is a orientation selector user interface of a multichannel controller.

Another one of the icons 108 in icons portion 106 in FIG. 1 is an Orientation Selector icon. FIG. 10 shows an example of an Orientation Selector user interface 1002 that is displayed after the Orientation Selector icon is selected. Interface 1002 includes four icons 1004, 1006, 1008, and 1010 that represent the four orientations that the controller may be positioned in (e.g. device bottom down, bottom to the right, bottom up, and bottom to the left). Selection of one of icons 1004, 1006, 1008, or 1010 determines the orientation that the controller presents the user interfaces.

Figure 11:
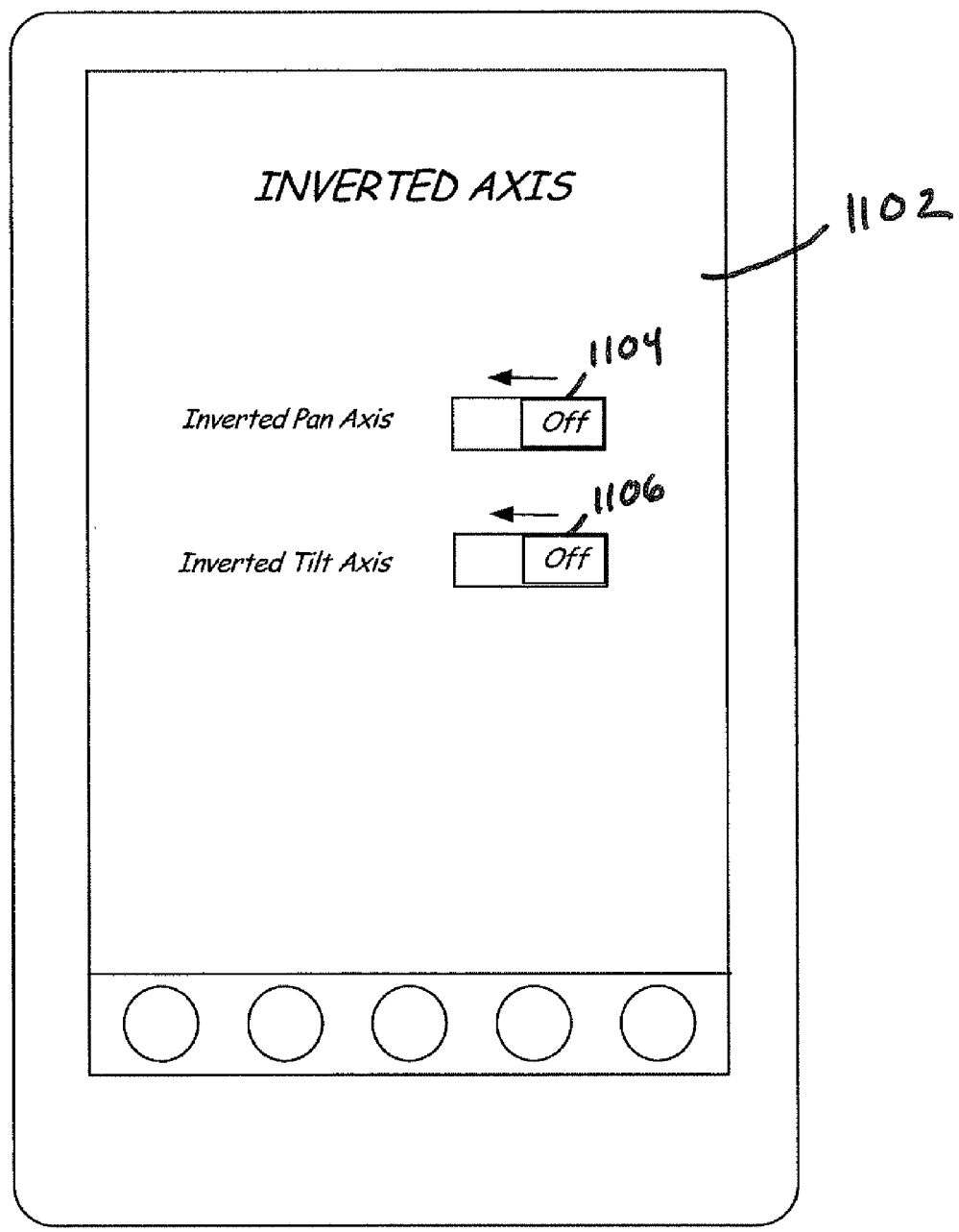
FIG. 11 is an inverted axis selector user interface of a multichannel controller.

FIG. 11 shows an example of an Inverted Axis Selector user interface 1102 that is displayed after an Inverted Axis Selector icon 108 is selected from icons portion 106 in FIG. 1. Interface 1102 includes a pan icon 1104 that can be toggled between on and off positions to invert control of the pan axis, and a tilt icon 1106 that can be toggled between on and off positions to invert control of the tilt axis. Toggling either icon 1104 or 1106 causes the direction of rotation for the axis to be reversed.

Figure 12:
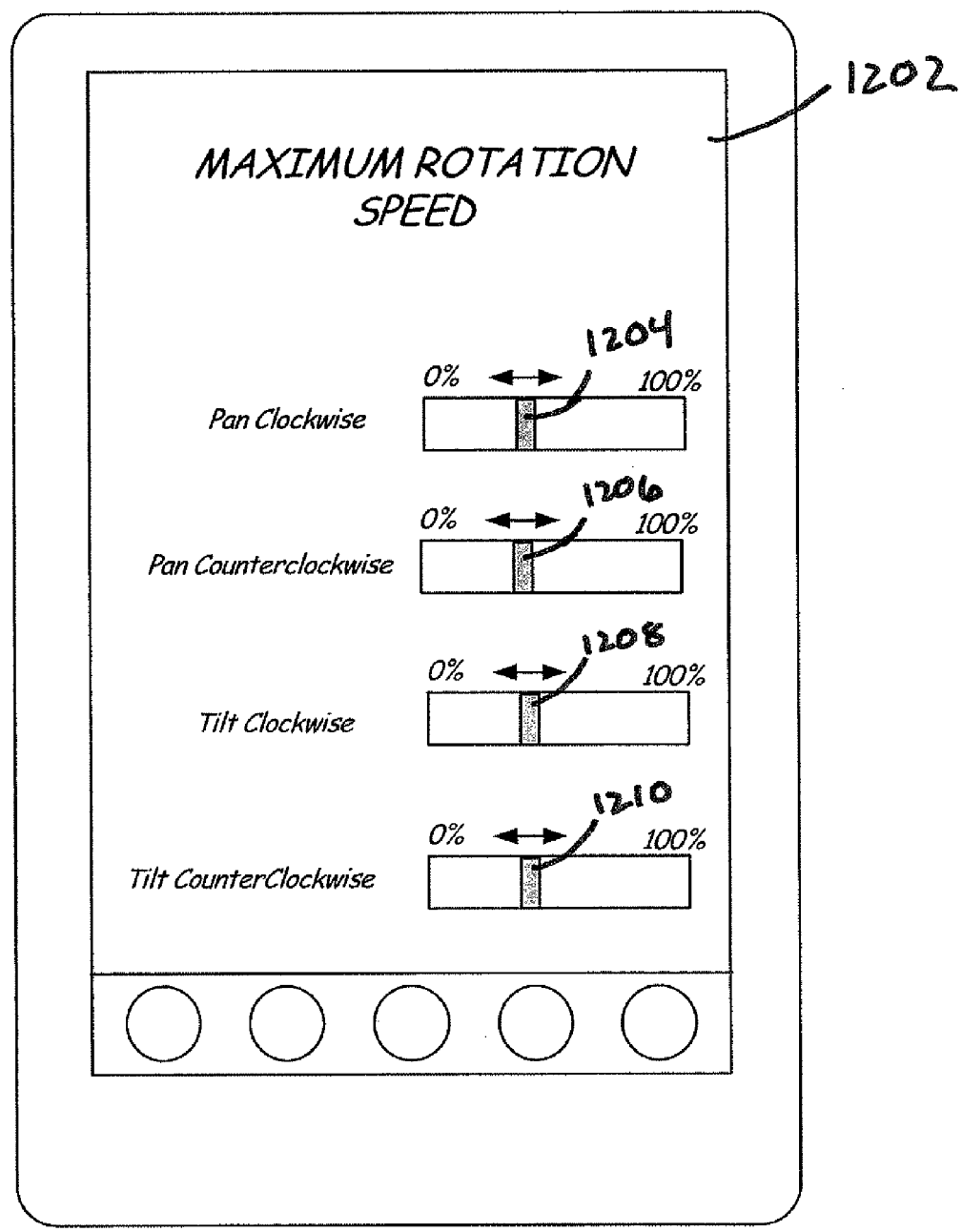
FIG. 12 is a maximum rotational speed selector user interface of a multichannel controller.

FIG. 12 shows an example of a Maximum Rotational Speed Selector user interface 1202 that is displayed after a Maximum Rotational Speed Selector icon 108 is selected from icons portion 106 in FIG. 1. Interface 1202 includes four icons 1204, 1206, 1208, and 1210 that can be set between 0 and 100% to set the maximum rotational speed of the motors.

Figures 1, 13:
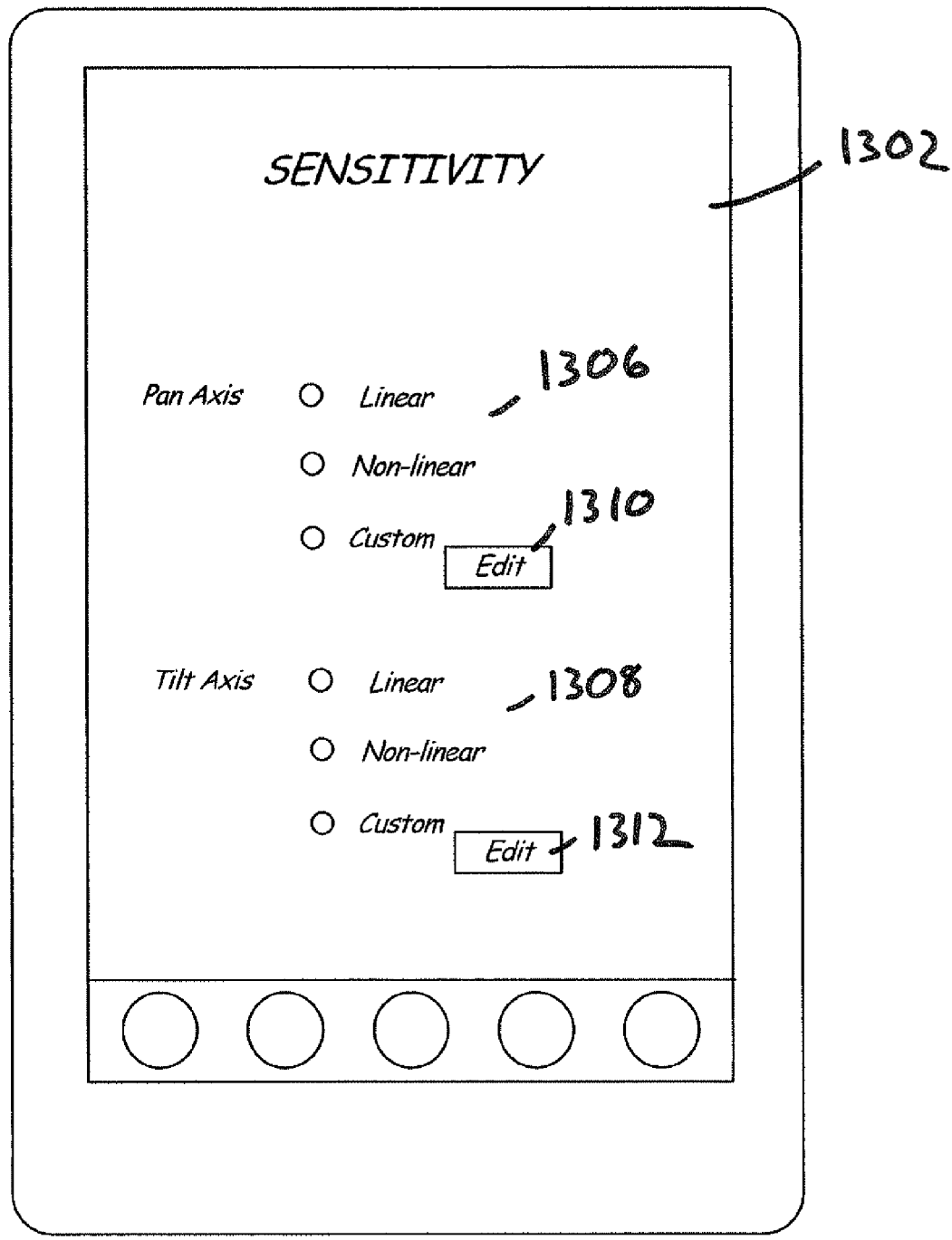
Figures 2, 13:
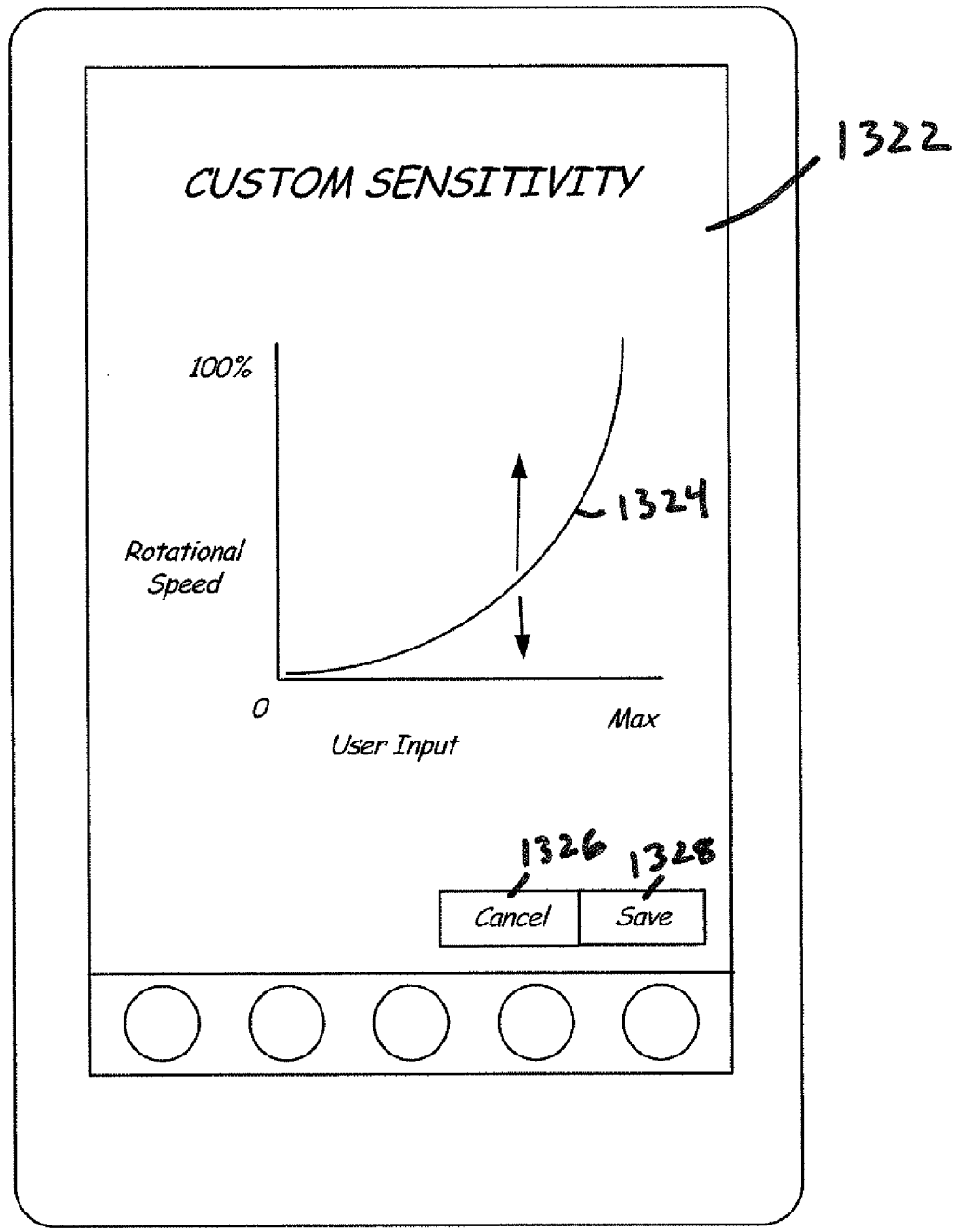

FIG. 13-1 shows an example of a Sensitivity Selector user interface 1302 that is displayed after a Sensitivity Selector icon 108 is selected from icons portion 106 in FIG. 1. Interface 1302 includes a pan axis portion 1306 and a tilt axis portion 1308. Each portion 1306 and 1308 includes three radio buttons. A user can set the sensitivity of each axis to linear, non-linear, or custom. Additionally, a user can select edit buttons 1310 and 1312 to edit the customized sensitivity. FIG. 13-2 shows an example of a Custom Sensitivity user interface 1322 that is displayed after one of the edit buttons 1310 or 1312 is selected. User interface 1322 includes a user editable sensitivity response line 1324. A user can move response line 1324 up and down along the entire length of the line to set a custom sensitivity response. User interface 1322 includes a cancel button 1326 and a save button 1328. A user can press the cancel button 1326 to undo any changes to response line 1324 and return to the previous screen, and a user can press the save button 1328 to save changes to response line 1324 and return to the previous screen.

Figure 14:
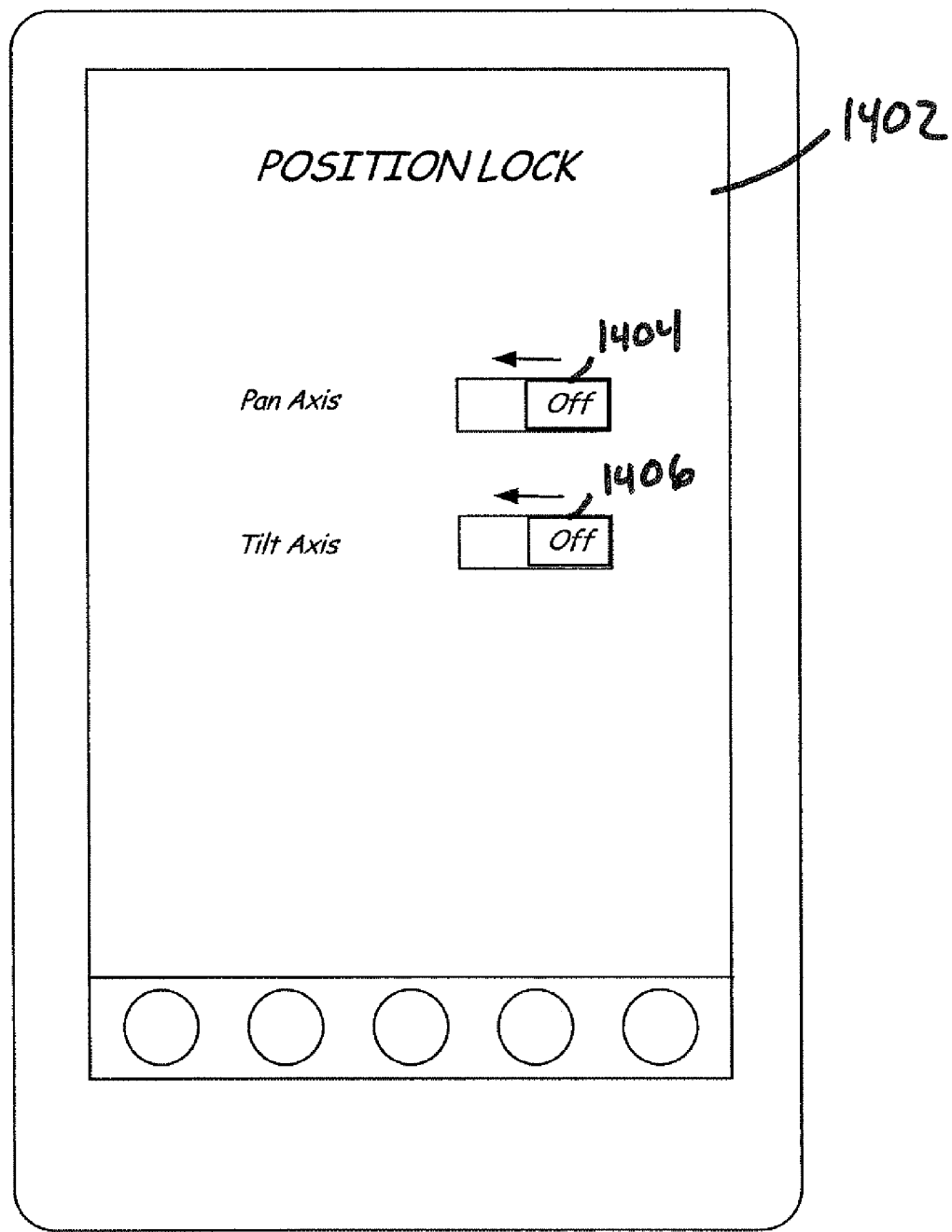
FIG. 14 is a position lock user interface of a multichannel controller.

FIG. 14 shows an example of a Position Lock user interface 1402 that is displayed after a Position Lock icon 108 is selected from icons portion 106 in FIG. 1. Interface 1402 includes a pan position lock icon 1404 and a tilt position lock icon 1406. Toggling either icon 1404 or 1406 from the off to the on position locks the corresponding motor at its current position.

Figure 15:
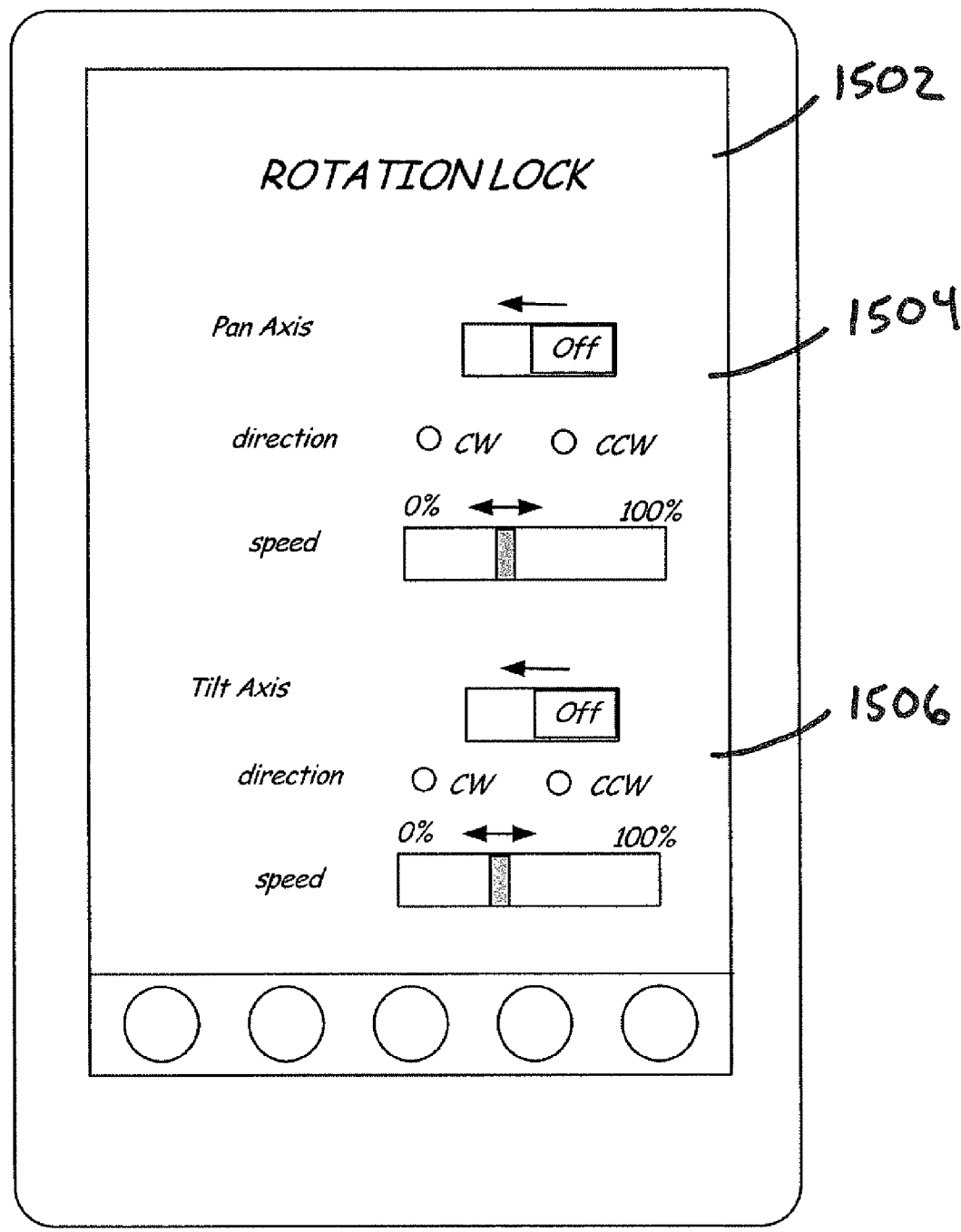
FIG. 15 is a rotation lock user interface of a multichannel controller.

FIG. 15 shows an example of a Rotation Lock user interface 1502 that is displayed after a Rotation Lock icon 108 is selected from icons portion 106 in FIG. 1. Interface 1502 includes a pan axis portion 1504 and a tilt axis portion 1506. Each axis portion includes an icon to toggle the rotation lock from the off to the on position. Each axis portion also includes a radio button to indicate the direction of rotation and a speed selector to select from 0 to 100% of the maximum rotation speed.

Figure 16:
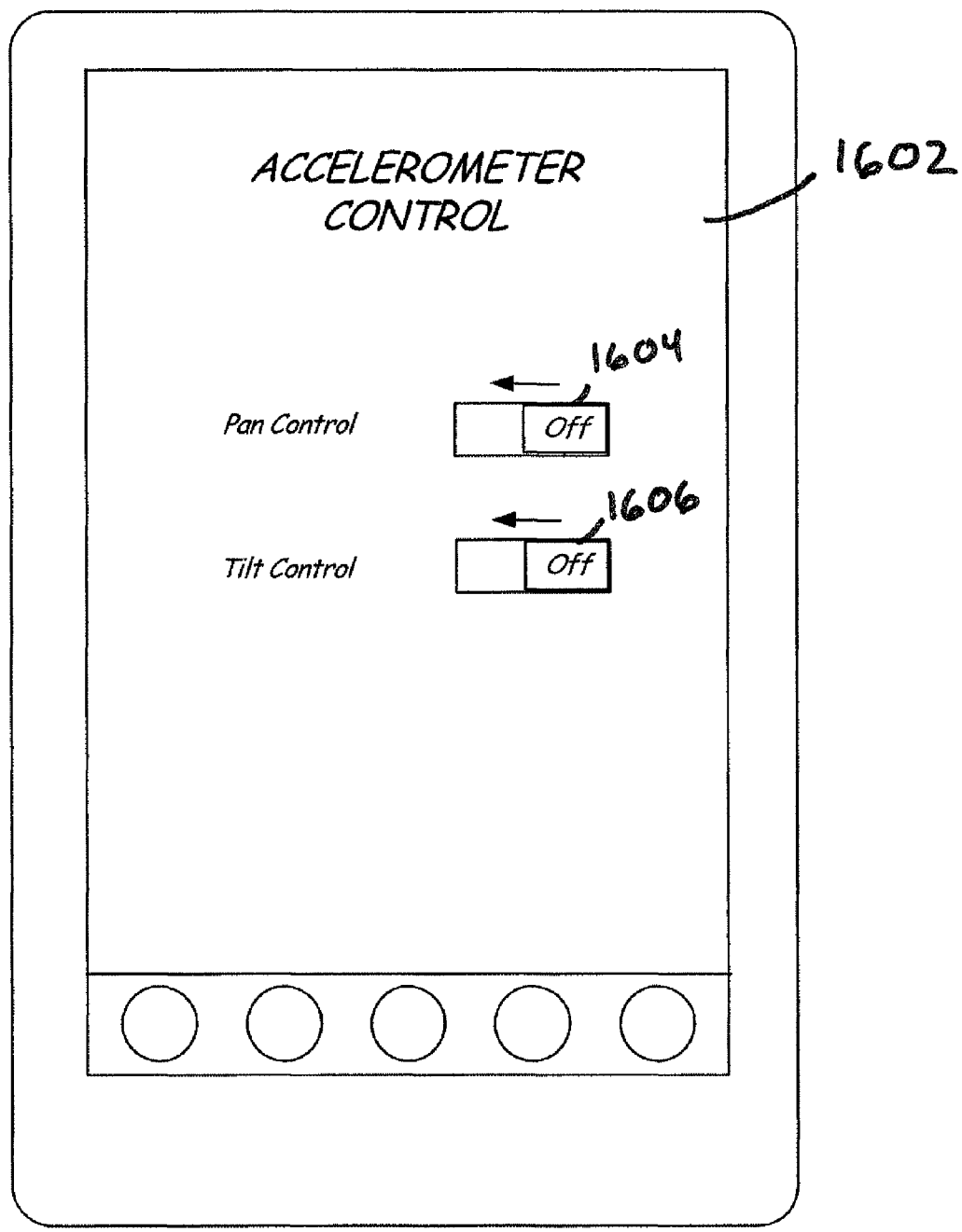
FIG. 16 is an accelerometer selector user interface of a multichannel controller.

FIG. 16 shows an example of an Accelerometer Selector user interface 1602 that is displayed after an Accelerometer Selector icon 108 is selected from icons portion 106 in FIG. 1. Interface 1602 includes a pan icon 1604 and a tilt icon 1606. Toggling pan icon 1604 from the off to the on position causes rotation of the pan motor to be controlled by accelerometer feedback, and toggling icon 1606 from the off to the on position causes rotation of the tilt motor to be controlled by accelerometer feedback. In accelerometer control mode, the rotational speed of the motors is dependent upon the angle of the controller from a center/home position.

Figures 1, 17:
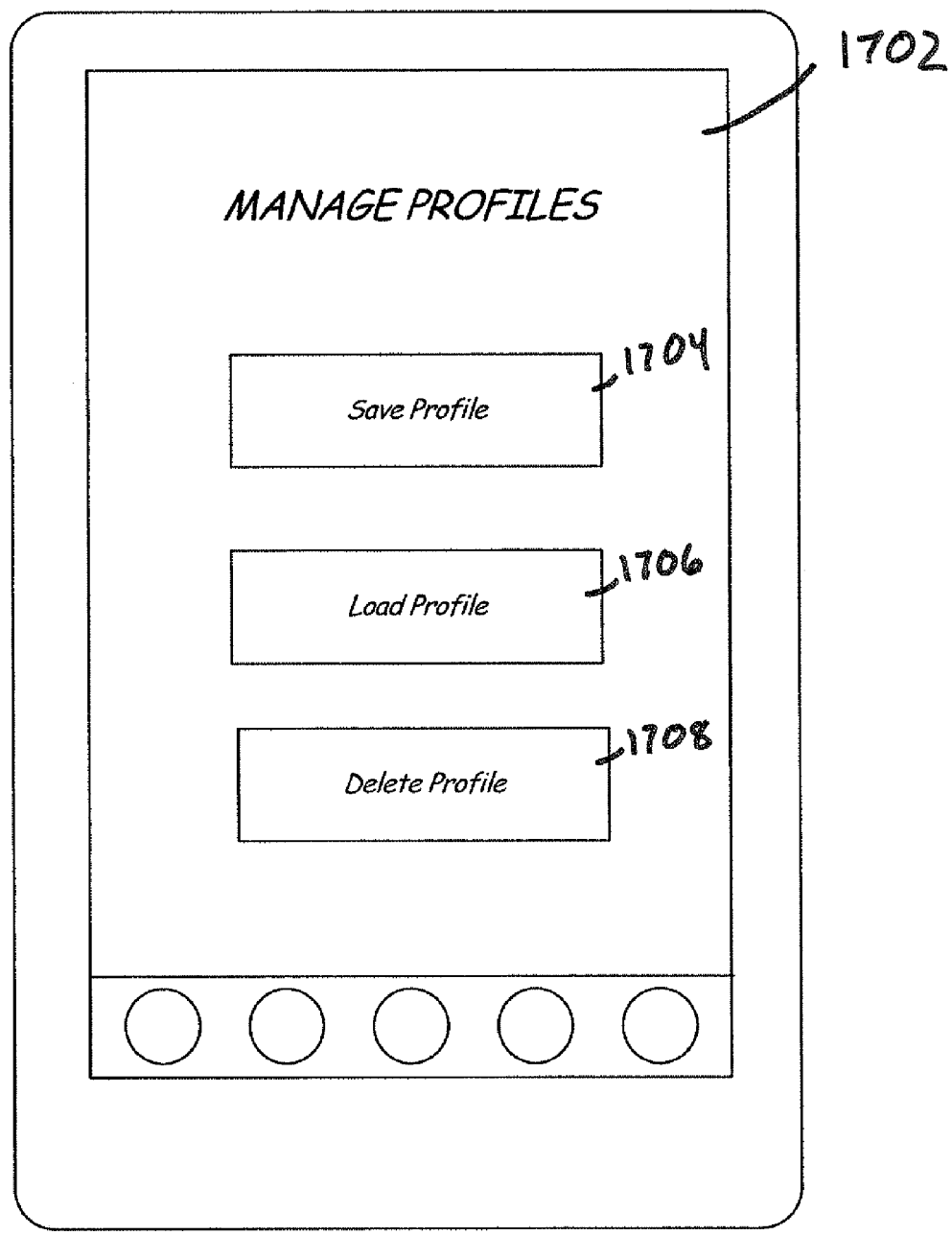
Figures 2, 17:
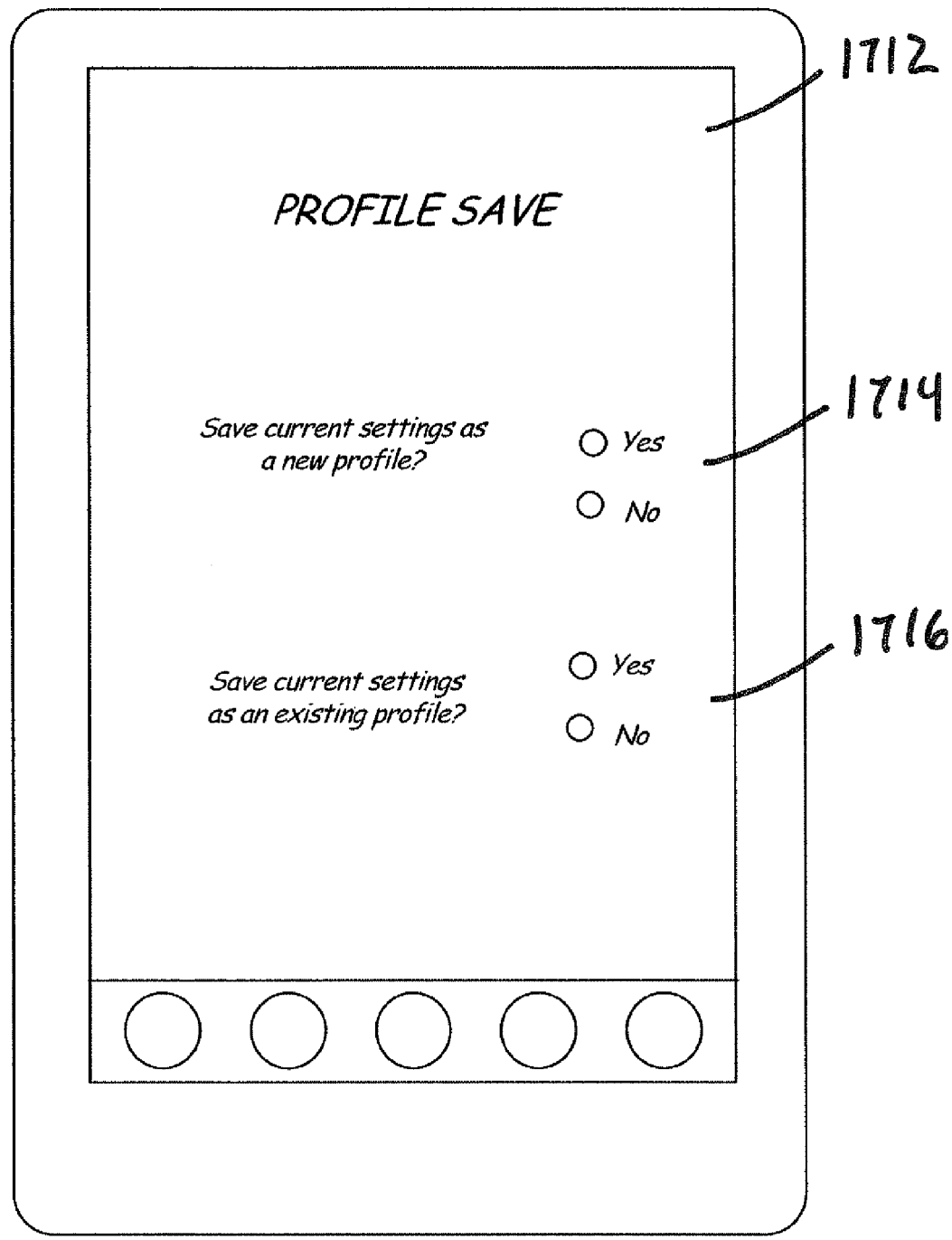
Figures 3, 17:
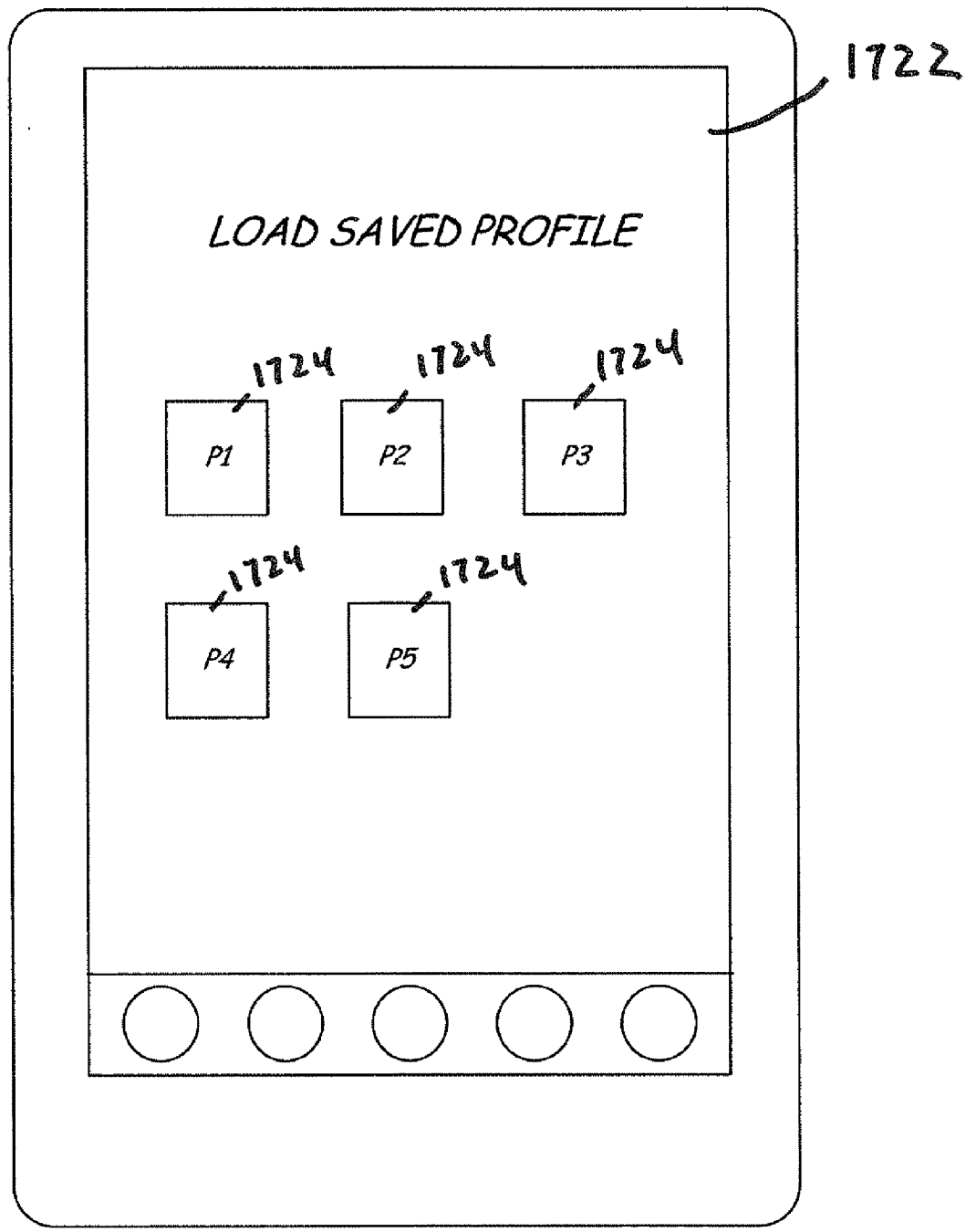
Figures 4, 17:
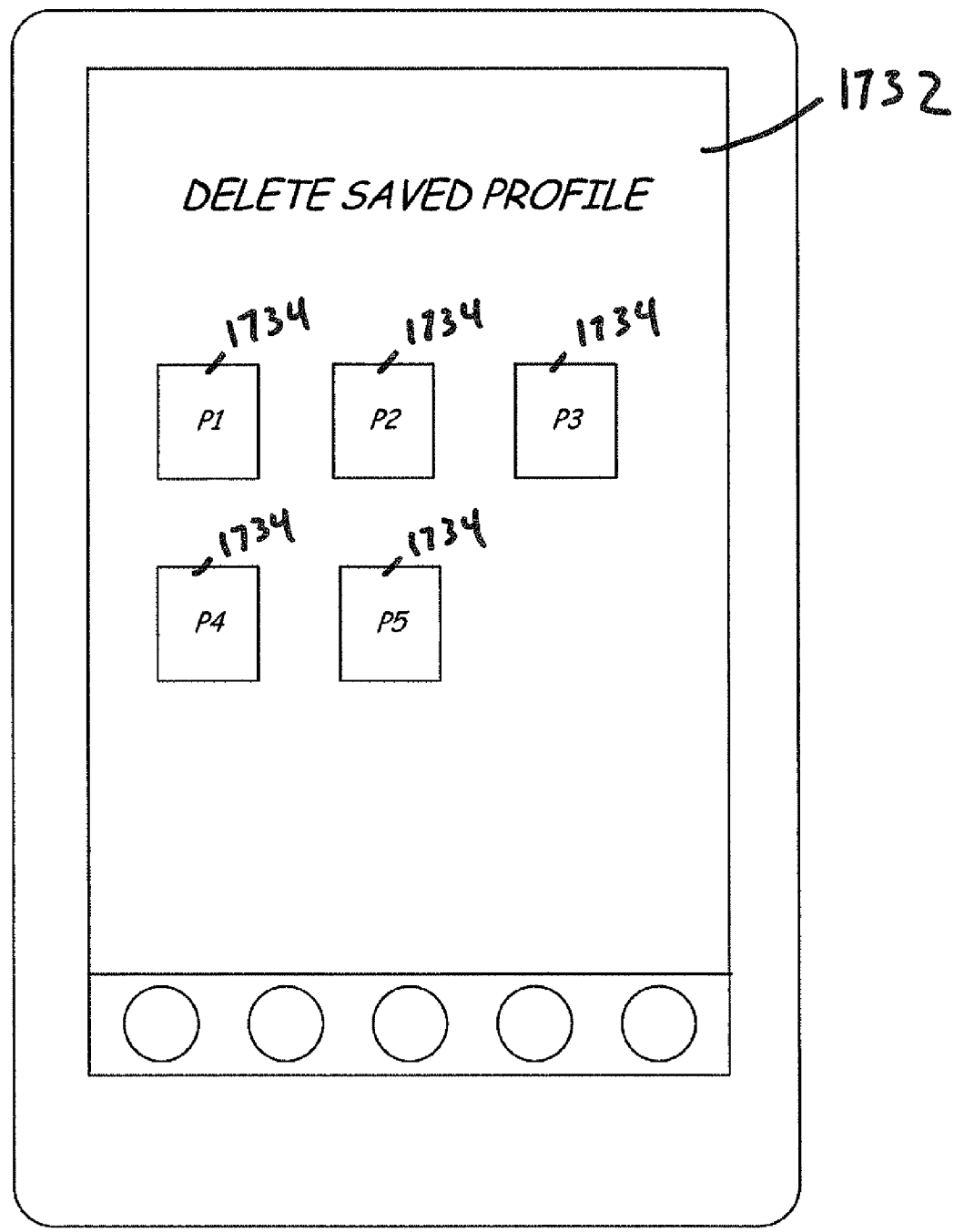

FIGS. 17-1, 17-2, 17-3, and 17-4 show examples of user interfaces associated with managing user profiles. FIG. 17-1 shows a Manage Profiles user interface 1702 that is displayed after a Manage Profile icon 108 is selected from icons portion 106 in FIG. 1. Interface 1702 includes a save profile icon 1704, a load profile icon 1706, and a delete profile icon 1708. Selection of save profile icon 1704 causes user interface 1712 in FIG. 17-2 to be displayed. In interface 1712, a user can save the current controller settings as a new profile by selecting the yes radio button 1714 or save the current controller settings as an existing profile by selecting the yes radio button 1716. If the save as a new profile button 1714 is selected, the user is presented with a screen that enables the user to type in a name of the new profile. If the save as existing profile button 1716 is selected, the user is presented with a screen that enables the user to select one of the previously saved profiles.

FIG. 17-3 shows a Load Saved Profile user interface 1722 that is displayed upon a user selecting the load profile icon 1706 in FIG. 17-1. Interface 1722 shows icons 1724 that represent the previously save profiles. Selection of one of icons 1724 loads the controller with the previously saved settings. A confirmation step is optionally displayed prior to changing the controller settings.

FIG. 17-4 shows a Delete Saved Profile user interface 1732 that is displayed upon a user selecting the delete profile icon 1708 in FIG. 17-1. Interface 1732 shows icons 1734 that represent the previously saved profiles. Selection of one of icons 1734 deletes the previously saved profile. A confirmation step is optionally displayed prior to deleting the selected profile.

Figures 1, 18:
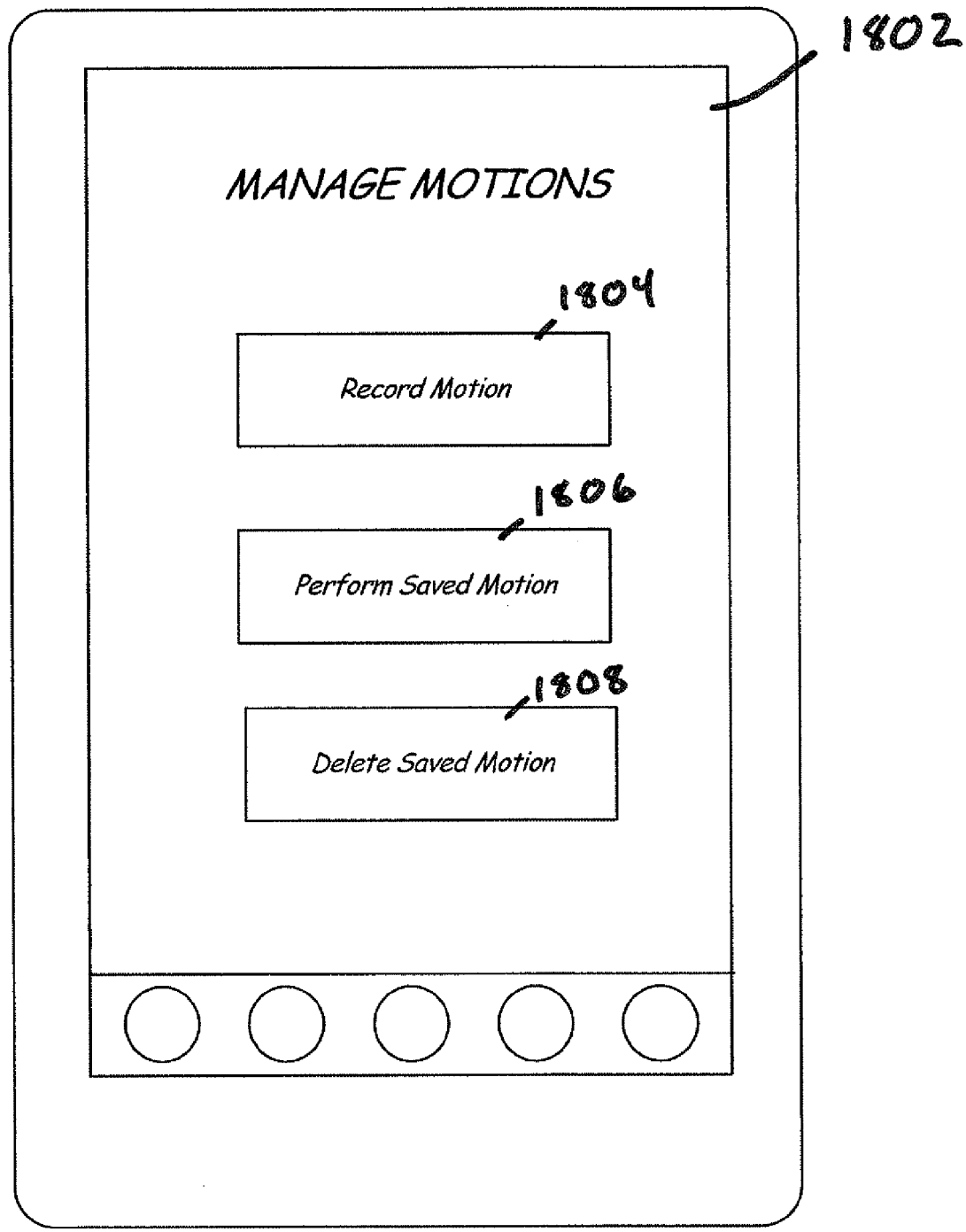
Figures 2, 18:
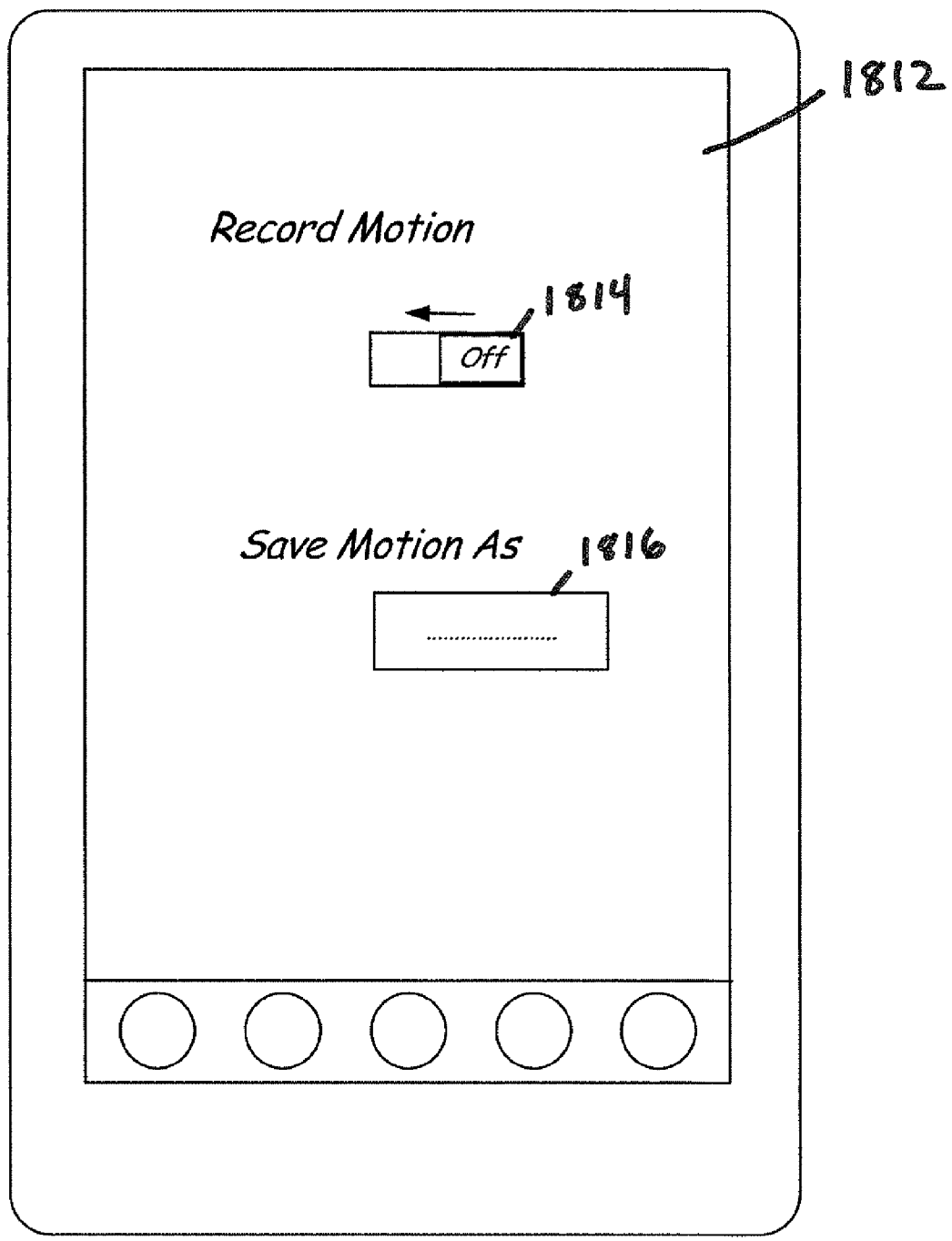
Figures 3, 18:
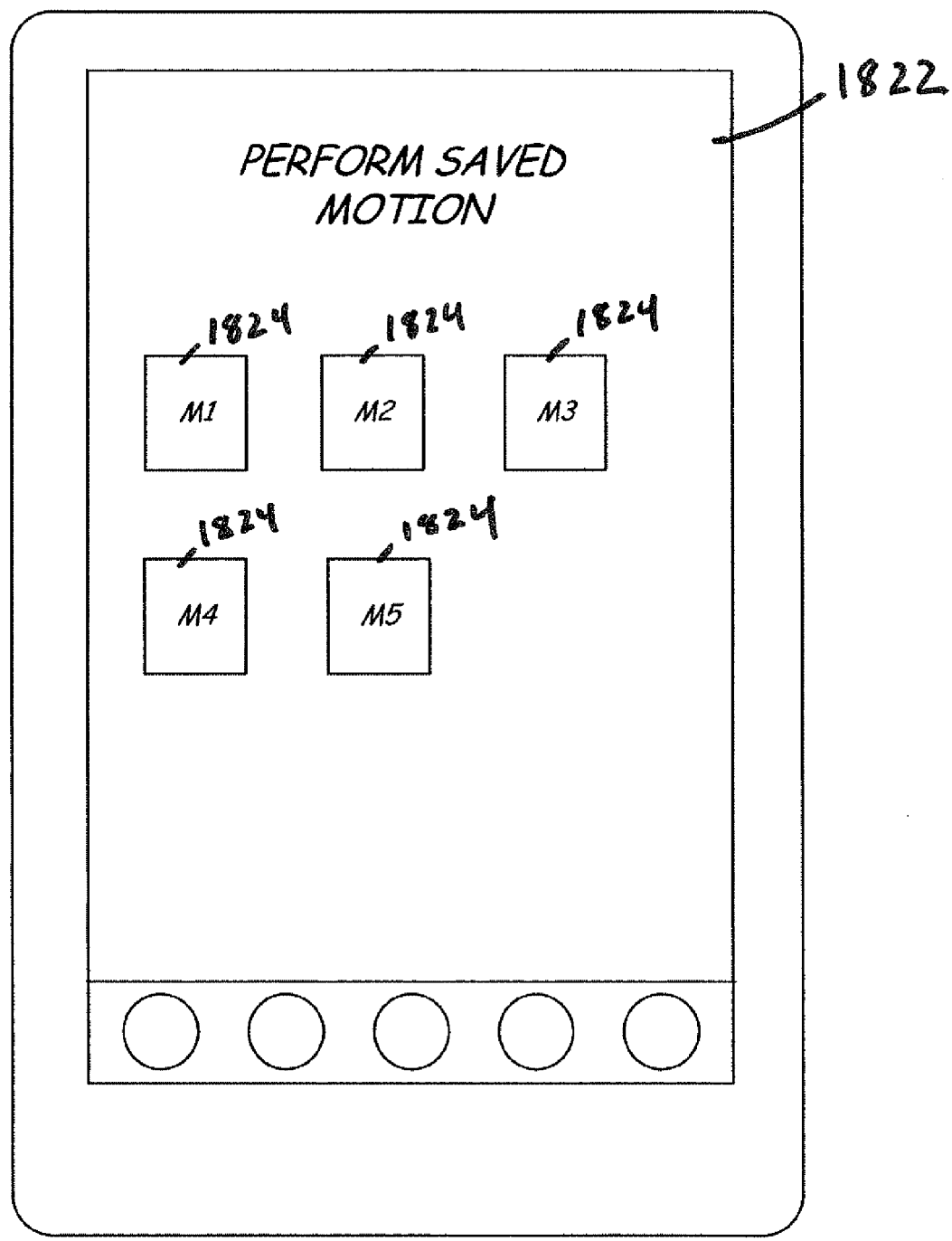
Figures 4, 18:
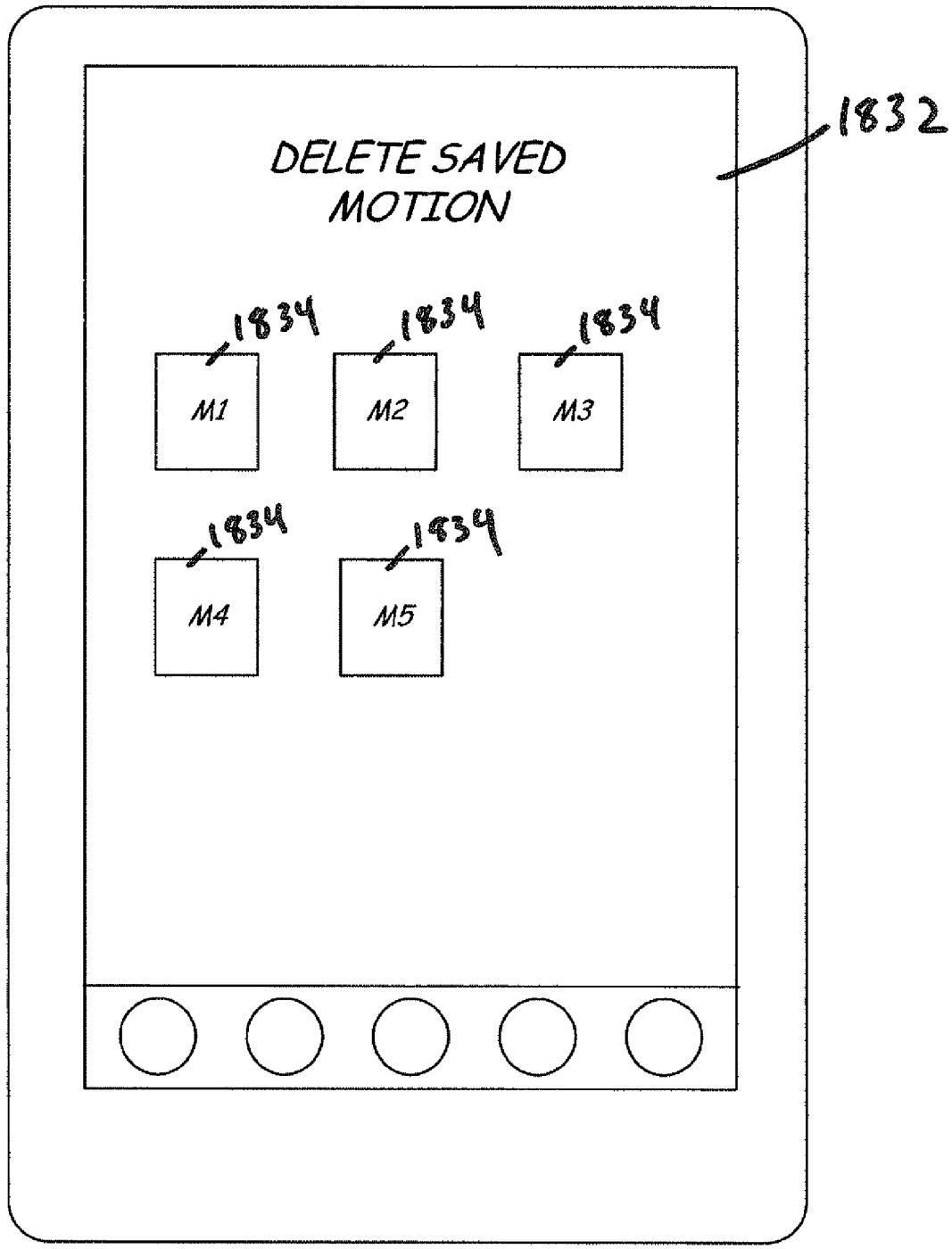

FIGS. 18-1, 18-2, 18-3, and 18-4 show examples of user interfaces associated with managing predefined motions. FIG. 18-1 shows a Manage Motions user interface 1802 that is displayed after a Manage Motion icon 108 is selected from icons portion 106 in FIG. 1. Interface 1802 includes a record motion icon 1804, a perform saved motion icon 1806, and a delete saved motion icon 1808. Selection of record motion icon 1804 causes user interface 1812 in FIG. 18-2 to be displayed. In interface 1812, a user can record a motion by toggling icon 1814 to the on position, and a user can enter a name for the recorded motion be selecting icon 1816. In one embodiment, a user is able to record a motion by drawing a shape on the user interface. For instance, a user can draw and record a spiral motion, a circle, a line, a rectangle, or any other shape. The controller illustratively records both the shape of the drawing and the speed at which each portion of the shape is drawn. The controller translates the shape and speed into control commands for the multichannel device. For example, slowly drawn portions cause the multichannel device to rotate more slowly, and quickly drawn portions cause the multichannel device to rotate more quickly.

FIG. 18-3 shows a Perform Saved Motion user interface 1822 that is displayed after the Perform Saved Motion icon 1806 in FIG. 18-1 is selected. Interface 1822 includes icons 1824 that correspond to previously recorded/saved motions. Selection of one of icons 1824 causes the motors to perform the previously recorded/saved motion.

FIG. 18-4 shows a Delete Save Motion user interface 1832 that is displayed after the Delete Saved Motion icon 1808 in FIG. 18-1 is selected. Interface 1832 includes icons 1834 that correspond to previously recorded/saved motions. Selection of one of icons 1834 causes the selected motion to be deleted. A confirmation step is optionally displayed prior to deleting the motion.

Figure 19:
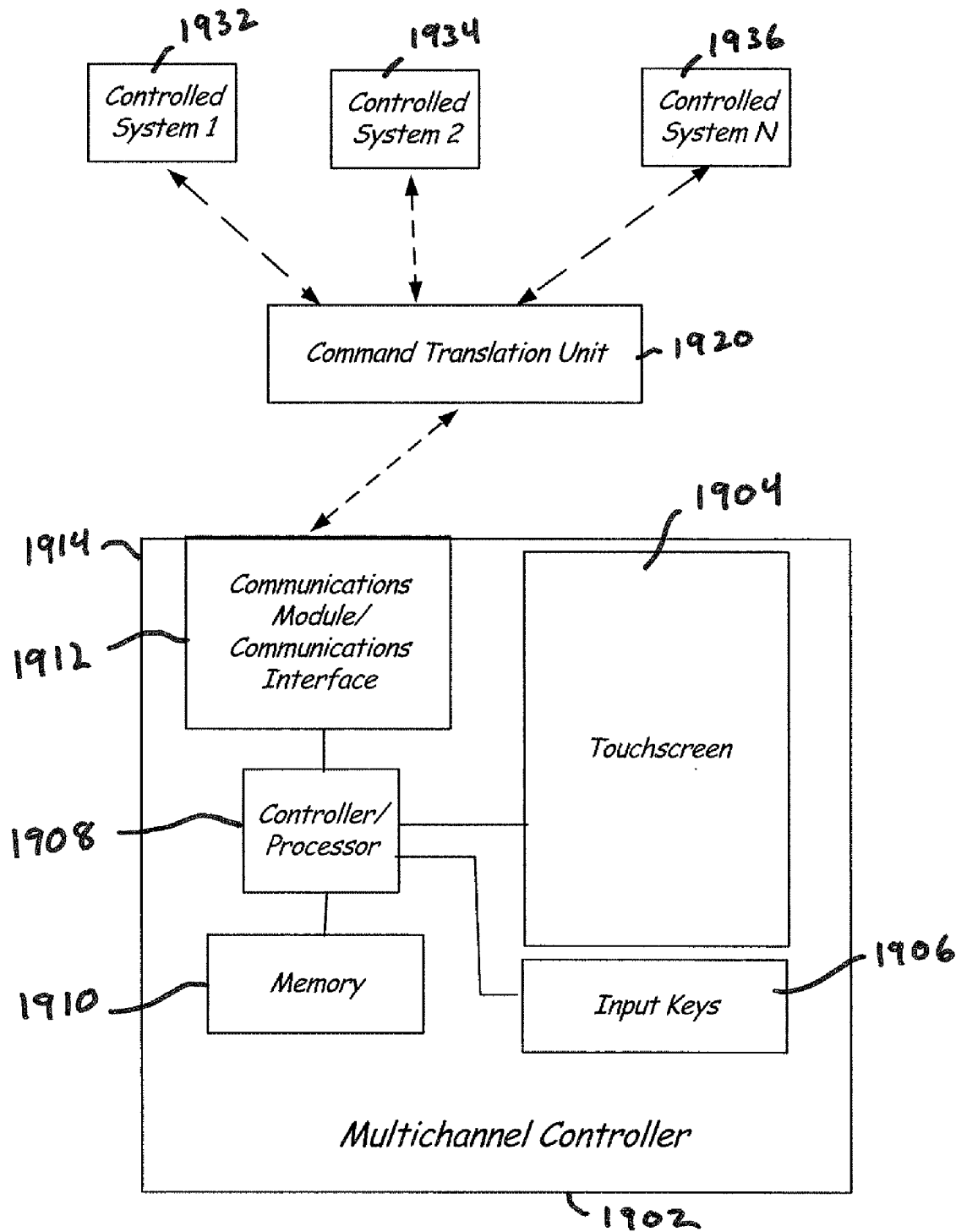
FIG. 19 is an operating environment of a multichannel controller.

FIG. 19 shows one illustrative operating environment of a multichannel controller 1902. Multichannel controller illustratively includes a touchscreen 1904, input keys 1906, a controller/processor 1908, memory 1910, a communications module/communications interface 1912, and a housing/case 1914. Touchscreen 1904 illustratively includes any type of single touch or multitouch screen (e.g. capacitive touchscreen, vision based touchscreen, etc.). Touchscreen 1904 is able to detect a user's finger, stylus, etc. contacting touchscreen 1904 and generates input data (e.g. x and y coordinates) based on the detected contact. Input keys 1906 include buttons or other mechanical devices that a user is able to press or otherwise actuate to input data. For instance, input keys 1906 may include a home button, a back button, 0-9 number keys, a QWERTY keyboard, etc. Memory 1910 includes volatile, non-volatile or a combination of volatile and non-volatile memory. Memory 1910 may be implemented using more than one type of memory. For example, memory 1910 may include any combination of flash memory, magnetic hard drives, RAM, etc. Memory 1910 stores the computer executable instructions that are used to implement the multichannel controllers. Memory 1910 also stores user saved data such as programmed maneuvers or profile settings. Controller/processor 1908 can be implemented using any type of controller/processor (e.g. ASIC, RISC, ARM, etc.) that can process user inputs and the stored instructions to generate commands for controlling systems such as, but not limited to, pan and tilt camera systems. The generated commands, etc. are sent to communications module/communications interface 1914 that transmits the commands to the controlled systems. Finally with respect to multichannel controller 1902, the controller housing 1914 can be any suitable housing. In one embodiment, housing 1914 has a form factor such that controller 1902 is able to fit within a user's hand. Housing 1914 may however be larger (e.g. tablet sized) and is not limited to any particular form factor.

As is shown in FIG. 19, multichannel controller optionally communicates (e.g. wirelessly or wired) to a command translation unit 1920. Command translation unit 1920 converts or transforms commands received from multichannel controller 1902 into the format that can be processed by the systems being controlled. It should be noted however that not all implementations include a command translation unit 1920, and that in other embodiments, multichannel controller 1902 instead directly sends commands to the systems being controlled.

FIG. 19 shows multichannel controller 1902 controlling N systems 1932, 1934, and 1936. In an embodiment, multichannel controller 1902 can control any number of systems (e.g. 1, 2, 3, 4 etc.). A user is illustratively able to choose which system is being controlled by selecting the system from a user interface. For instance, controller 1902 illustratively includes a user interface that shows the user all of the systems that can be controlled (e.g. represents each system as a separate icon), and the user selects one of the systems. Alternatively, in certain embodiments, a user is able to control multiple systems at the same time. For example, in one embodiment, controller 1902 is able to control systems 1932, 1934, and 1936 at variable levels of autonomy (e.g. manual, semi-autonomous, or fully autonomous). Controller 1902 is able to control more than one system at a time and is able to control the systems at different levels of autonomy. One controlled system may for instance be performing a programmed maneuver or tracking an object, while another system may be in fully manual control mode.

In an embodiment, multichannel controller 1902 is able to control systems 1932, 1934, and 1936 in either an open loop mode or in a closed loop mode. In open loop mode, controller 1902 does not receive feedback from the controlled systems. For instance, controller 1902 does not necessarily know the position, speed, etc. of the controlled systems. However, in closed loop mode, controller 1902 does receive feedback from one or more of the controlled systems. Controller 1902 may for instance receive feedback indicating a position (e.g. angular position), speed, etc. of a pan and/or tilt motor. In such cases, controller 1902 is able to use the feedback in generating new commands for the systems. For instance, a user may wish to set a speed, position, etc. of a controlled system. Controller 1902 illustratively receives feedback from the controlled system indicating its current speed, position, etc., and the controller adjusts the command signal based on the current speed, position, etc. and based on the speed, position, etc. that is intended/desired by a user.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although certain embodiments described herein are directed to pan and tilt systems, it will be appreciated by those skilled in the art that the teachings of the disclosure can be applied to other types of multichannel control systems, without departing from the scope and spirit of the disclosure.

What is claimed is:

1. A non-transitory computer-readable storage medium having computer-executable instructions that, when executed, cause a computing device to execute operations comprising displaying a user interface on a display of the computing device for controlling a pan/tilt device, the user interface comprising:
   a control mode selector that
      displays a plurality of control mode selector icons, each of the plurality of control mode selector icons corresponding to a control mode of a plurality of control modes,
      receives a user input selection of one of the plurality of control mode selector icons, and
      displays a control mode corresponding to the selected control mode selector icon, wherein displaying the control mode comprises displaying, in the main portion of the user interface, a user controllable icon corresponding to the control mode,
   a functionality limitation setting mechanism that
      receives a user input selection of a functionality limitation applied to the selected direction of movement on the user controllable icon to limit the functionally in which the pan/tilt device is moved in the selected direction of movement on the user controllable icon,
      wherein a user indicates a speed of movement of the pan/tilt device, the speed of movement of pan/tilt device corresponding to the distance the icon is moved from the center position or a rotational speed of the icon; and
      wherein the user interface is accessed on a touch screen interface of the computing device.

2. The user interface of claim 1, wherein the plurality of control mode comprises a touchpad mode,
   wherein the touchpad mode displays, in the main portion of the user interface, a solid color or a video from the pan/tilt device and enables a user to control the pan/tilt device by making touch gestures in the main portion of the user interface.

3. The user interface of claim 1, wherein the plurality of control modes comprises a trackball mode,
   wherein the trackball mode, displays, in the main portion of the user interface, a user controllable trackball icon and enables a user to control the pan/tilt device by rotating the trackball icon.

4. The user interface of claim 1, wherein the plurality of control modes comprises a joystick mode,
   wherein the trackball mode displays, in the main portion of the user interface, a user controllable joystick icon and enables a user to control the pan/tilt device by moving a position of the joystick icon.

5. The user interface of claim 1, wherein the functionality limitation setting mechanism further comprises a speed sensitivity setting mechanism.

6. The user interface of claim 1, wherein the functionality limitation setting mechanism further comprises a position lock setting mechanism.

7. The user interface of claim 6, wherein the position lock setting mechanism further comprises a user selection of an axis of movement of the pan/tilt device.

8. The user interface of claim 1, wherein the functionality limitation setting mechanism further comprises a maximum speed setting mechanism.

9. The user interface of claim 1, and further comprising: a zoom setting mechanism, wherein a user indicates a zoom setting for the pan/tilt device.

10. A device comprising a controller coupled to one or more processors, a display, and a touchscreen interface on the display for a pan/tilt device, the controller comprising:
    a display configured to display a plurality of control mode selector icons, each of the plurality of control mode selector icons corresponding to a control mode of a plurality of control modes;
    a user input mechanism configured to receive a user selection of one of the plurality of control mode icons on a touchscreen;
       wherein in response to the user selection, the displays a control mode corresponding to the selected control mode selector icon, wherein displaying the control mode comprises displaying, in the main portion of the user interface, a user controllable icon corresponding to the control mode;
    a signal generator configured to
       receive a user input selection of a functionality limitation applied to the selected direction of movement on the user controllable icon to limit the functionally in which the pan/tilt device is moved in the selected direction of movement on the user controllable icon;
       wherein a user indicates a speed of movement of the pan/tilt device, the speed of movement of pan/tilt device corresponding to the distance the icon is moved from the center position or a rotational speed of the icon;
    a processor that is configured to transmit the control signal to a motor of the pan/tilt device.

11. The controller of claim 10, wherein the controller is a phone.

12. The controller of claim 10, wherein the controller further comprises a zoom setting, wherein the zoom setting indicates a zoom level for a feed receiver of the pan/tilt device.

13. The controller of claim 10, wherein the controller further comprises a position lock setting.

14. The controller of claim 10, wherein the position lock setting locks a position of the pan/tilt device such that the pan/tilt device is unable to move along a locked axis.

15. The controller of claim 10, and further comprising: a mode selector, wherein the user selects to operate the controller in an open-loop mode or a closed loop-mode.

16. A method for controlling a pan/tilt device, the method comprising:
    displaying a plurality of control mode selector icons on a touchscreen display of a computing device, each of the plurality of control mode selector icons corresponding to a control mode of a plurality of control modes;

receiving a user input selection of one of the plurality of control mode selector icons;

displaying a control mode corresponding to the selected control mode selector icon, wherein displaying the control mode comprises displaying, in the main portion of the user interface, a user controllable icon corresponding to the control mode;

receiving a user input indicative of a direction and a speed of movement for a pan/tilt device on the user controllable icon;

wherein the speed of movement of pan/tilt device corresponding to the distance the icon is moved from the center position or a rotational speed of the icon;

translating the received user input into a control signal comprising the indicated direction and speed; and transmitting the control signal to the pan/tilt device.

17. The method of claim 16, and further comprising: saving the indicated direction and speed of movement for the pan/tilt device.

18. The method of claim 16, and further comprising: repeating the method for a plurality of pan/tilt devices.

* * * * *